(12) United States Patent
Nakamura

(10) Patent No.: US 12,745,301 B2
(45) Date of Patent: Sep. 22, 2026

(54) INFORMATION PROCESSING DEVICE AND INFORMATION PROCESSING METHOD

(71) Applicants: Nissan Motor Co., Ltd., Kanagawa (JP); RENAULT S.A.S., Boulogne-Billancourt (FR)

(72) Inventor: Mitsunori Nakamura, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 201 days.

(21) Appl. No.: 18/659,982

(22) Filed: May 9, 2024

(65) Prior Publication Data

US 2024/0298367 A1 Sep. 5, 2024

Related U.S. Application Data

(63) Continuation of application No. 17/602,625, filed as application No. PCT/IB2019/000402 on Apr. 9, 2019, now Pat. No. 12,022,539.

(51) Int. Cl.
*H04W 76/14* (2018.01)
*H04W 4/02* (2018.01)
*H04W 4/40* (2018.01)

(52) U.S. Cl.
CPC .......... *H04W 76/14* (2018.02); *H04W 4/025* (2013.01); *H04W 4/40* (2018.02)

(58) Field of Classification Search
CPC ............................ H04W 76/14; H04W 4/025
See application file for complete search history.

(56) References Cited

U.S. PATENT DOCUMENTS 12,022,539 B2 * 6/2024 Nakamura ............ H04W 4/025
2017/0069207 A1 * 3/2017 Ma .................. G08G 1/096791
2019/0075436 A1 3/2019 Yukizaki et al.
2019/0197899 A1 6/2019 Lim

FOREIGN PATENT DOCUMENTS

CN 103327558 A 9/2013
CN 103327559 A 9/2013
CN 108966183 A * 12/2018 ............ H04W 4/023
KR 101407705 B1 * 6/2014
WO 2017/136627 A1 8/2017
WO 2017/159240 A1 9/2017

* cited by examiner

*Primary Examiner* — Erika A Washington
(74) *Attorney, Agent, or Firm* — Osha Bergman Watanabe & Burton LLP

(57) ABSTRACT

An information processing device includes: a communication unit mounted on a moving object and communicates directly with the moving object and another moving object or communicates indirectly with the moving object and the another moving object via a fixed and non-moving communication device; and a controller configured to control the direct communication and the indirect communication performed by the communication unit. The controller is configured to: determine a priority of a message generated by the moving object based on information requiring attention of the another moving object; select at least one of the direct communication or the indirect communication based on the determined priority; and transmit the message by the selected at least one of the direct communication or the indirect communication.

11 Claims, 18 Drawing Sheets

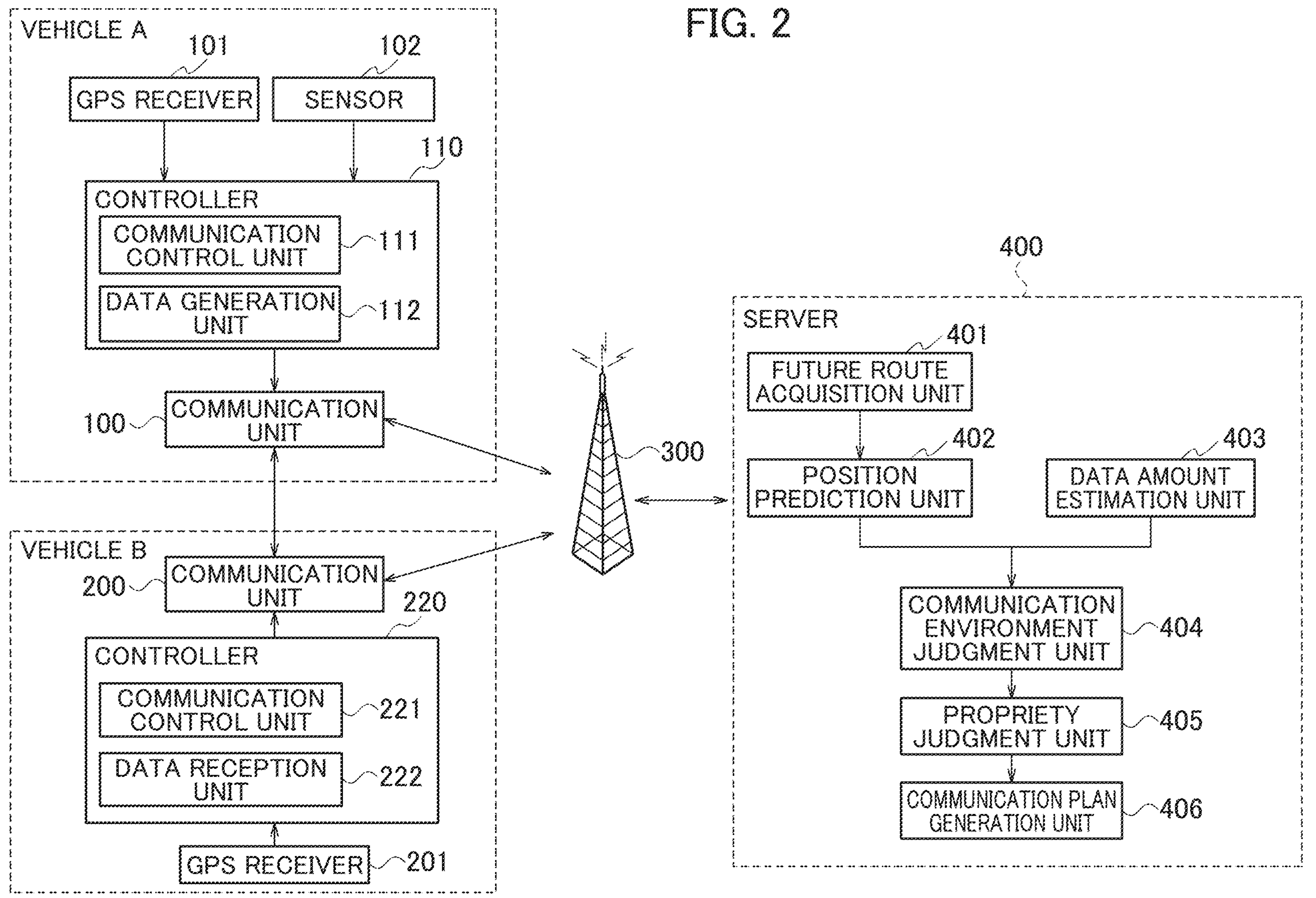
FIG. 2
VEHICLE A
101
102
GPS RECEIVER
SENSOR
110
CONTROLLER
COMMUNICATION CONTROL UNIT
111
DATA GENERATION UNIT
112
100
COMMUNICATION UNIT
VEHICLE B
200
COMMUNICATION UNIT
220
CONTROLLER
COMMUNICATION CONTROL UNIT
221
DATA RECEPTION UNIT
222
GPS RECEIVER
201
300
400
SERVER
401
FUTURE ROUTE ACQUISITION UNIT
402
POSITION PREDICTION UNIT
403
DATA AMOUNT ESTIMATION UNIT
COMMUNICATION ENVIRONMENT JUDGMENT UNIT
404
PROPRIETY JUDGMENT UNIT
405
COMMUNICATION PLAN GENERATION UNIT
406

FIG. 3

| | INITIAL DATA CONTAINER CONFIRMATION | UNIT DATA AMOUNT | MAXIMUM NUMBER | DATA AMOUNT (10 HZ INTERVAL) |
|---|---|---|---|---|
| OVERHEAD | ● | 200 bytes | | 200 bytes |
| VEHICLE INFORMATION, INCLUDING CURRENT POSITION INFORMATION OF VEHICLE A | ● | 40 bytes | 1 | 40 bytes |
| INFORMATION RELATED TO PAST TRAJECTORY AND TRAVEL PLAN OF VEHICLE A | ● | 600 bytes | 1 | 600 bytes |
| RECOGNITION INFORMATION OF SURROUNDING OBJECT | ● | 600 bytes | 11 | 6,600 bytes |
| SENSOR DATA | ● | 3 Mbytes | 8 | 24 Mbytes |
| | | | | 24 Mbytes +7,440 bytes |

FIG. 5

| | (1) RADIO WAVE INTENSITY ESTIMATION RESULT | DATA TRANSFER ESTIMATED AMOUNT | (2) CHANNEL UTILIZATION RATE MEASUREMENT RESULT | REDUCTION ESTIMATED RATE | (3) DETA AUTO DELETION RATE MEASUREMENT RESULT | REDUCTION ESTIMATED RATE |
|---|---|---|---|---|---|---|
| ENVIRONMENT LEVEL 1 (BEST) | HIGHER THAN 10 TIMES MINIMUM RECEIVING POWER | 4,800 (x2 9,600) (x4 19,200) | 0–15% | 0 | 0 | 0 |
| ENVIRONMENT LEVEL 2 | HIGHER THAN 10 TIMES AVERAGE RECEIVING POWER | 1,200 | 15–30% | 1/2 | 1–3 TIMES THINNING | 1/3 |
| ENVIRONMENT LEVEL 3 | SAME AS RECEIVING SENSITIVITY-APPROXIMATELY 10 TIMES RECEIVING POWER | 300 | 30–60% | 1/4 | 3–5 TIMES THINNING | 1/2 |
| ENVIRONMENT LEVEL 4 (ADVERSE ENVIRONMENT) | SAME AS RECEIVING SENSITIVITY | 0 | 60%–90% | 1/10 | RANDOM | 2/3 |
| ENVIRONMENT LEVEL 5 (UNAVAILABLE) | LESS THAN RECEIVING SENSITIVITY | 0 | 90–100% | 1 | ALL DELETION | 1 |

FIG. 6

| | (1) RADIO WAVE INTENSITY ESTIMATION RESULT | DATA TRANSFER ESTIMATED AMOUNT | (2) CHANNEL UTILIZATION RATE MEASUREMENT RESULT | REDUCTION ESTIMATED RATE | (3) DETA AUTO DELETION RATE MEASUREMENT RESULT | REDUCTION ESTIMATED RATE |
|---|---|---|---|---|---|---|
| ENVIRONMENT LEVEL 1 (BEST) | HIGHER THAN 10 TIMES MINIMUM RECEIVING POWER | 4,800 (x2 9,600) (x4 19,200) | 0-15% | 0 | 0 | 0 |
| ENVIRONMENT LEVEL 2 | HIGHER THAN 10 TIMES AVERAGE RECEIVING POWER | 1,200 | 15-30% | 1/2 | 1-3 TIMES THINNING | 1/3 |
| ENVIRONMENT LEVEL 3 | SAME AS RECEIVING SENSITIVITY-APPROXIMATELY 10 TIMES RECEIVING POWER | 300 | 30-60% | 1/4 | 3-10 TIMES THINNING | 1/10 |
| ENVIRONMENT LEVEL 4 (ADVERSE ENVIRONMENT) | SAME AS RECEIVING SENSITIVITY | 0 | 60%-90% | 1/10 | RANDOM | 1/20 |
| ENVIRONMENT LEVEL 5 (UNAVAILABLE) | LESS THAN RECEIVING SENSITIVITY | 0 | 90-100% | 0% | ALL DELETION | 0% |

FIG. 7

| | INITIAL DATA CONTAINER CONFIRMATION | UNIT DATA AMOUNT | MAXIMUM NUMBER | DATA AMOUNT (10 HZ INTERVAL) |
|---|---|---|---|---|
| OVERHEAD | ● | 200 bytes | | 200 bytes |
| VEHICLE INFORMATION, INCLUDING CURRENT POSITION INFORMATION OF VEHICLE A | ● | 40 bytes | 1 | 40 bytes |
| INFORMATION RELATED TO PAST TRAJECTORY AND TRAVEL PLAN OF VEHICLE A | ● | 600 bytes | 1 | 600 bytes |
| RECOGNITION INFORMATION OF SURROUNDING OBJECT | ● | 600 bytes | 11 | 6,600 bytes |
| SENSOR DATA | ● | 3 Mbytes | 8 | 24 Mbytes |
| | | | | 24 Mbytes +7,440 bytes |

840 bytes 600 bytes

DIRECT COMMUNICATION (1.6 kbytes WITHIN)

600 bytesx10 +24 Mbytes

INDIRECT COMMUNICATION

VEHICLE A
VEHICLE B
SERVER
START
DETECT POSITION INFORMATION
S101
DETECT SHARED DATA
S103
TRANSMIT CIRCUMFERENCE
S105
RECEIVE DATA FROM VEHICLE A
S107
DETECT POSITION INFORMATION
S109
TRANSMIT DATA TO SERVER
S111
RECEIVE DATA
S113
ACQUIRE TRAVEL PLAN INFORMATION
S115
PREDICT POSITIONAL RELATIONSHIP
S117
ESTIMATE DATA AMOUNT
S119
1

VEHICLE A
VEHICLE B
SERVER
1
PREDICT FUTURE COMMUNICATION ENVIRONMENT
S121
ESTIMATE UPPER VALUE OF DIRECT COMMUNICATION
S123
CAN TRANSMIT ALL VIA DIRECT COMMUNICATION?
S125
YES
NO
GENERATE COMMUNICATION PLAN
S127
TRANSMIT COMMUNICATION PLAN
S129
S131
RECEIVE COMMUNICATION PLAN
RECEIVE COMMUNICATION PLAN
S133
CONTROL COMMUNICATION
CONTROL COMMUNICATION
S137
S135
END

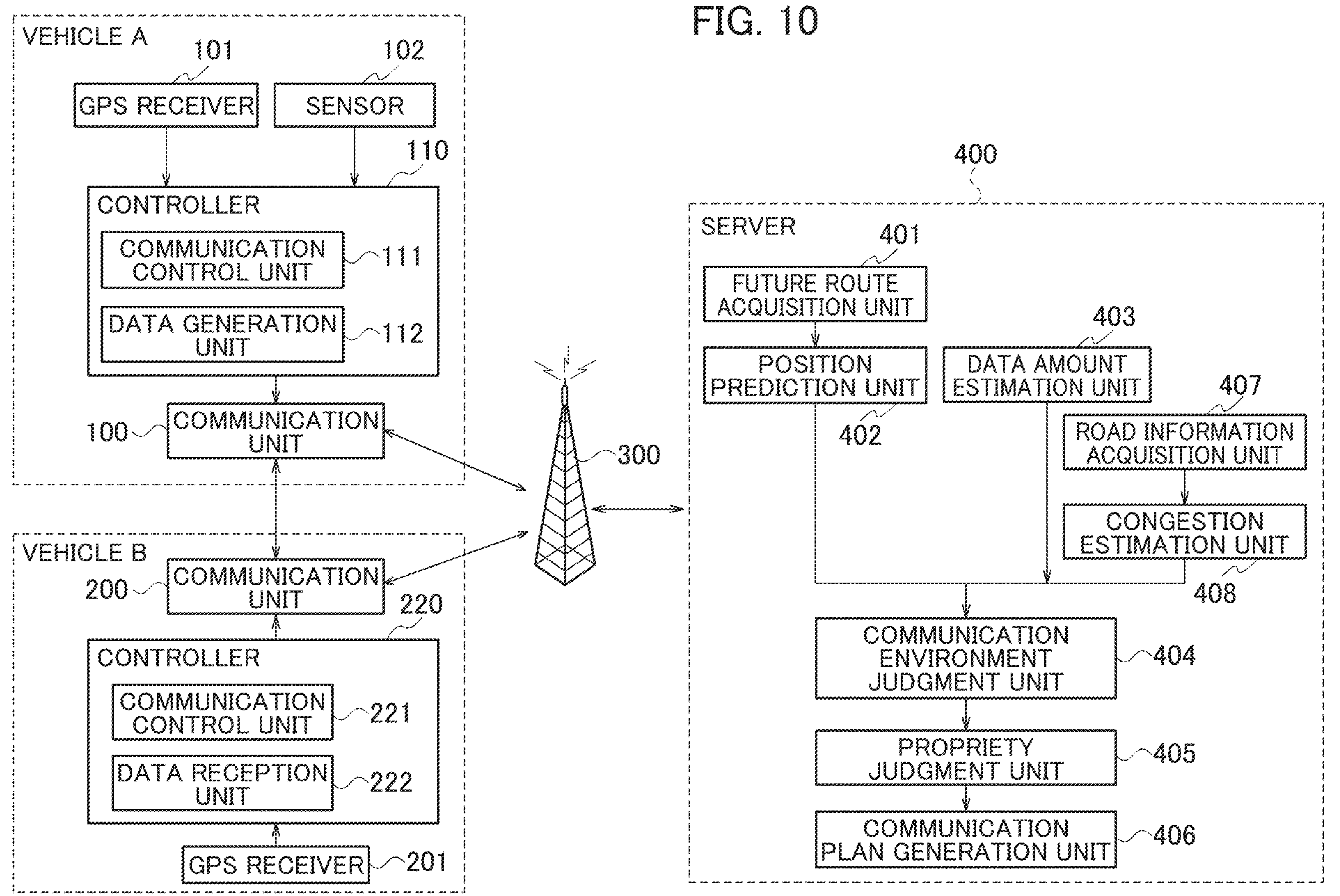
FIG. 10
VEHICLE A
101
102
GPS RECEIVER
SENSOR
110
CONTROLLER
COMMUNICATION CONTROL UNIT
111
DATA GENERATION UNIT
112
100
COMMUNICATION UNIT
VEHICLE B
200
COMMUNICATION UNIT
220
CONTROLLER
COMMUNICATION CONTROL UNIT
221
DATA RECEPTION UNIT
222
GPS RECEIVER
201
300
400
SERVER
401
FUTURE ROUTE ACQUISITION UNIT
403
POSITION PREDICTION UNIT
DATA AMOUNT ESTIMATION UNIT
407
402
ROAD INFORMATION ACQUISITION UNIT
CONGESTION ESTIMATION UNIT
408
COMMUNICATION ENVIRONMENT JUDGMENT UNIT
404
PROPRIETY JUDGMENT UNIT
405
COMMUNICATION PLAN GENERATION UNIT
406

500
VEHICLE A
WORKS INFORMATION
PRECEDING VEHICLE C
VEHICLE B

VEHICLE A
VEHICLE B
SERVER
START
DETECT POSITION INFORMATION
S201
DETECT SHARED DATA
S203
TRANSMIT CIRCUMFERENCE
S205
RECEIVE DATA FROM VEHICLE A
S207
DETECT POSITION INFORMATION
S209
TRANSMIT DATA TO SERVER
S211
RECEIVE DATA
S213
ACQUIRE TRAVEL PLAN INFORMATION
S215
PREDICT POSITIONAL RELATIONSHIP
S217
ESTIMATE DATA AMOUNT
S219
2

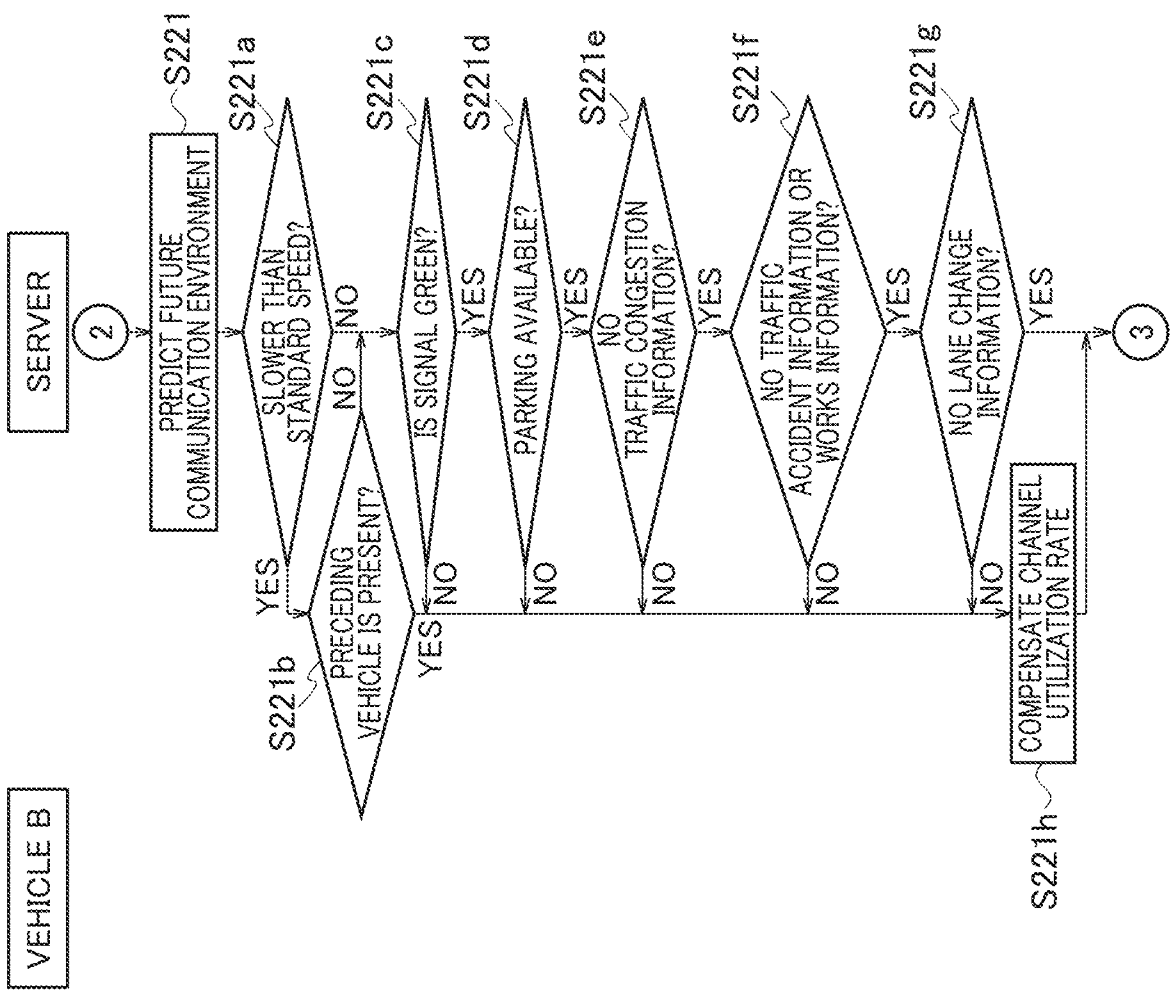
FIG. 13
VEHICLE A
VEHICLE B
SERVER
2
PREDICT FUTURE COMMUNICATION ENVIRONMENT
S221
SLOWER THAN STANDARD SPEED?
S221a
YES
NO
PRECEDING VEHICLE IS PRESENT?
S221b
YES
NO
IS SIGNAL GREEN?
S221c
YES
NO
PARKING AVAILABLE?
S221d
YES
NO
NO TRAFFIC CONGESTION INFORMATION?
S221e
YES
NO
NO TRAFFIC ACCIDENT INFORMATION OR WORKS INFORMATION?
S221f
YES
NO
NO LANE CHANGE INFORMATION?
S221g
YES
NO
COMPENSATE CHANNEL UTILIZATION RATE
S221h
3

VEHICLE A
VEHICLE B
SERVER
3
ESTIMATE UPPER VALUE OF DIRECT COMMUNICATION
S223
S225
CAN TRANSMIT ALL VIA DIRECT COMMUNICATION?
YES
NO
GENERATE COMMUNICATION PLAN
S227
TRANSMIT COMMUNICATION PLAN
S229
S231
RECEIVE COMMUNICATION PLAN
RECEIVE COMMUNICATION PLAN
S233
CONTROL COMMUNICATION
CONTROL COMMUNICATION
S237
S235
END

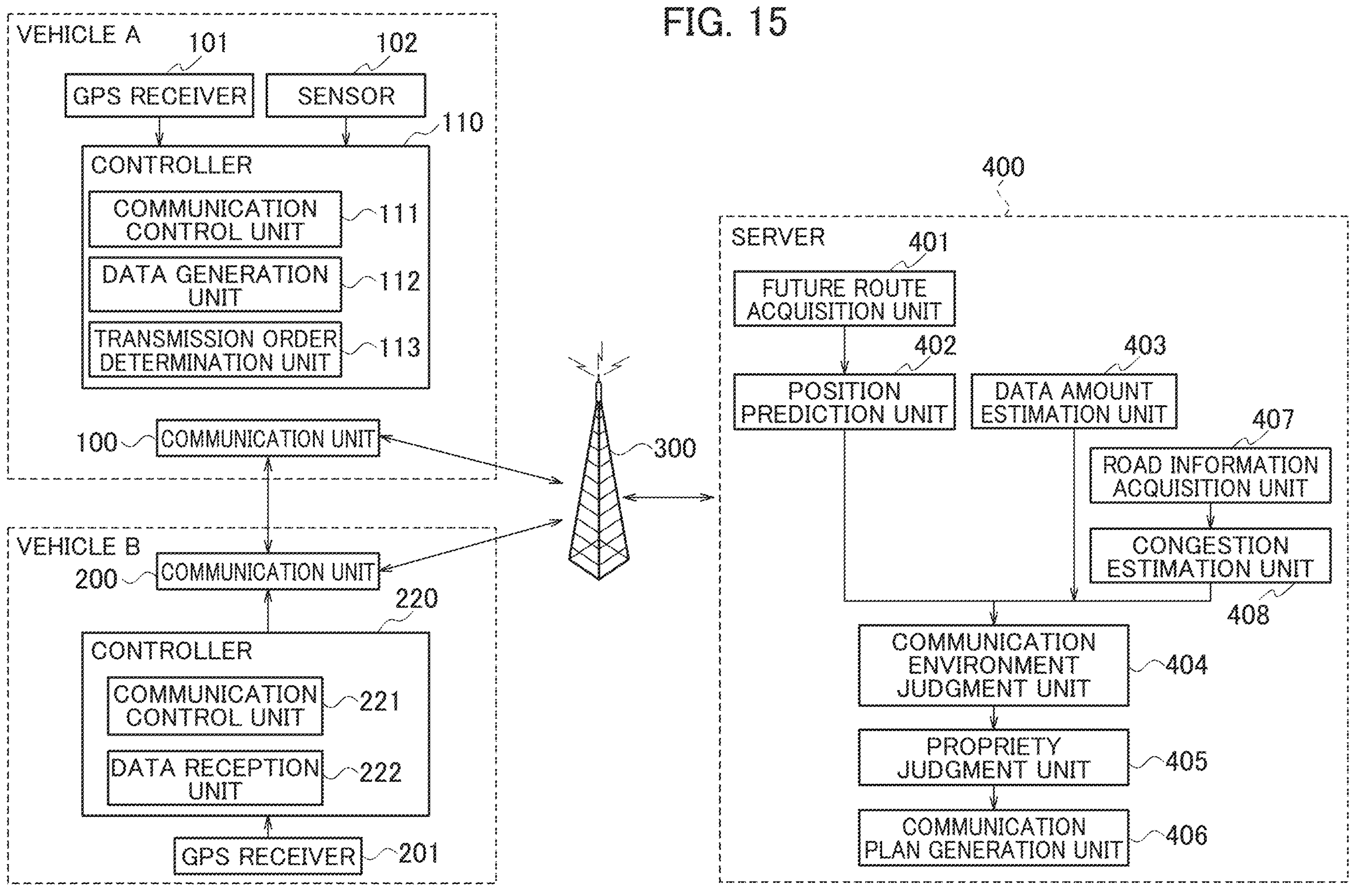
FIG. 15
VEHICLE A
101
102
GPS RECEIVER
SENSOR
110
CONTROLLER
COMMUNICATION CONTROL UNIT
111
DATA GENERATION UNIT
112
TRANSMISSION ORDER DETERMINATION UNIT
113
100
COMMUNICATION UNIT
300
VEHICLE B
200
COMMUNICATION UNIT
220
CONTROLLER
COMMUNICATION CONTROL UNIT
221
DATA RECEPTION UNIT
222
GPS RECEIVER
201
400
SERVER
401
FUTURE ROUTE ACQUISITION UNIT
402
403
POSITION PREDICTION UNIT
DATA AMOUNT ESTIMATION UNIT
407
ROAD INFORMATION ACQUISITION UNIT
CONGESTION ESTIMATION UNIT
408
COMMUNICATION ENVIRONMENT JUDGMENT UNIT
404
PROPRIETY JUDGMENT UNIT
405
COMMUNICATION PLAN GENERATION UNIT
406

FIG. 17

| VEHICLE B / VEHICLE A PRECEDING VEHICLE C SECOND PRECEDING VEHICLE D | TRAVEL STRAIGHT AT INTERSECTION | TURN RIGHT OR LEFT AT INTERSECTION | RIGHT TURN ON ONCOMING ROAD | LEFT TURN ON ONCOMING ROAD |
|---|---|---|---|---|
| STRAIGHT | POSSIBILITY OF INTERSECTING DEGREE OF PRIORITY:LEVEL 3 | VEHICLE B IS ON NOT PRIORITY SIDE DEGREE OF PRIORITY:LEVEL 2 | VEHICLE B IS ON NOT PRIORITY SIDE DEGREE OF PRIORITY:LEVEL 1 | APPROXIMATELY NO POSSIBILITY OF INTERSECTING DEGREE OF PRIORITY:LEVEL 5 |
| RIGHT TURN | VEHICLE B IS ON PRIORITY SIDE DEGREE OF PRIORITY:LEVEL 4 | RIGHT TURN OR LEFT TURN IS SAME DEGREE OF PRIORITY:LEVEL 4<br>RIGHT TURN VS LEFT TURN DEGREE OF PRIORITY:LEVEL 3 | APPROXIMATELY NO POSSIBILITY OF INTERSECTING DEGREE OF PRIORITY:LEVEL 5 | VEHICLE B IS ON PRIORITY SIDE DEGREE OF PRIORITY:LEVEL 4 |
| LEFT TURN | VEHICLE B IS ON PRIORITY SIDE DEGREE OF PRIORITY:LEVEL 4 | | POSSIBILITY OF INTERSECTING DEGREE OF PRIORITY:LEVEL 3 | APPROXIMATELY NO POSSIBILITY OF INTERSECTING DEGREE OF PRIORITY:LEVEL 5 |

FIG. 18

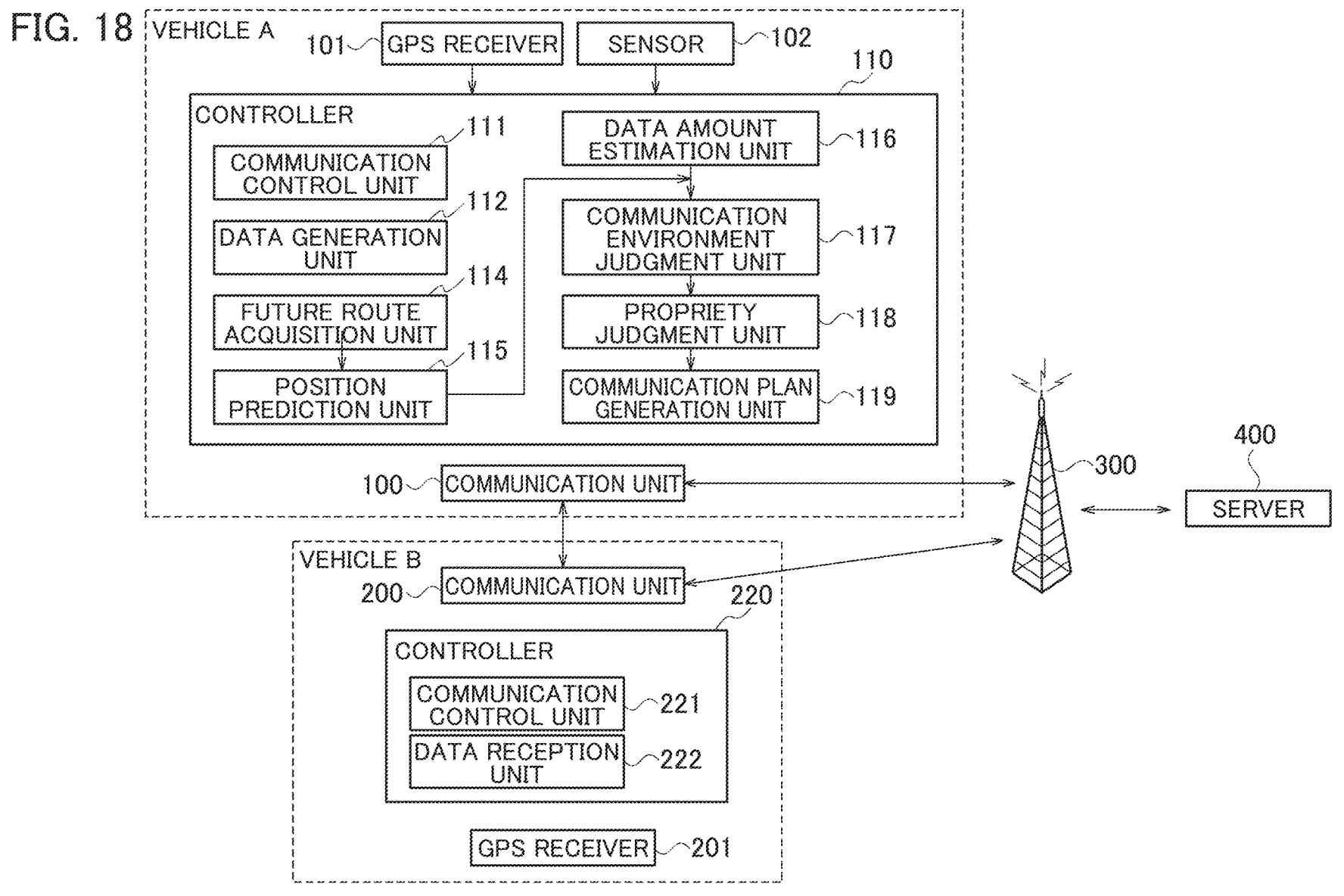

VEHICLE A
101 GPS RECEIVER
102 SENSOR
110 CONTROLLER
111 COMMUNICATION CONTROL UNIT
112 DATA GENERATION UNIT
114 FUTURE ROUTE ACQUISITION UNIT
115 POSITION PREDICTION UNIT
116 DATA AMOUNT ESTIMATION UNIT
117 COMMUNICATION ENVIRONMENT JUDGMENT UNIT
118 PROPRIETY JUDGMENT UNIT
119 COMMUNICATION PLAN GENERATION UNIT
100 COMMUNICATION UNIT

VEHICLE B
200 COMMUNICATION UNIT
220 CONTROLLER
221 COMMUNICATION CONTROL UNIT
222 DATA RECEPTION UNIT
201 GPS RECEIVER

300

400 SERVER

INFORMATION PROCESSING DEVICE AND INFORMATION PROCESSING METHOD

TECHNICAL FIELD

The present invention relates to an information processing device, an information processing method, and a server.

BACKGROUND ART

Methods are known that transmits and receives a communication packet indicating vehicle data such as position and speed of a vehicle between a plurality of vehicles (Patent Literature 1). Such transmission and reception between a plurality of vehicles is called inter-vehicle communication. The invention described in Patent Literature 1 adopts a wide area transmission cycle longer than a narrow area transmission cycle when a communication quality in inter-vehicle communication is more than or equal to an allowable level, and adopts a second wide area transmission cycle of a value equal to or smaller than the narrow area transmission cycle when the communication quality is less than the allowable level.

CITATION LIST

Patent Literature

Patent Literature 1: International Publication No. 2017/159240

SUMMARY OF INVENTION

Technical Problem

However, even if the communication is possible by inter-vehicle communication (the direct communication), depending on the route after that, there is a possibility that the strength of the radio wave becomes weak or the communication quality deteriorates depending on the state of congestion. In such a case, it becomes difficult to transmit and receive the data by the direct communication. Patent Literature 1 switches to the indirect communication when it is difficult to transmit and receive the data by the direct communication. However, for example, if it takes time for an initial connection to be established when switching from the direct communication to the indirect communication, smooth data sharing may be prevented.

In view of the foregoing problem, the present invention provides an information processing device, an information processing method, and a server capable of achieving smooth data sharing.

Solution to Problem

An information processing device according to one aspect of the present invention judges whether or not it is possible to transmit or receive a data amount related to a data amount information by the direct communication based on a positional information where the moving object and another moving object travels in the future, a communication environment information of the direct communication in the future according to the positional information, and the data amount information that the moving object will transmit to or receive from another moving object in the future; generates a communication plan information between the moving object and another moving object for at least one of the direct communication and the indirect communication when it is judged the data amount cannot be transmitted or received by the direct communication, and transmits the communication plan information to another moving object.

Advantageous Effects of Invention

According to the present invention, smooth data sharing is achieved.

BRIEF DESCRIPTION OF DRAWINGS

FIG. 2 is a schematic diagram illustrating a vehicle and a server according to the first embodiment of the present invention.

FIG. 3 is a diagram for explaining an example of a data amount estimation method according to the first embodiment of the present invention.

FIG. 5 is a diagram for explaining an example of a communication environment according to the first embodiment of the present invention.

FIG. 6 is a diagram for explaining an example of a communication environment according to the first embodiment of the present invention.

FIG. 7 is a diagram for explaining an example of the data amount that can be transmitted by the direct communication according to the first embodiment of the present invention.

FIG. 10 is a schematic diagram illustrating a vehicle and a server according to a second embodiment of the present invention.

FIG. 13 is a flowchart illustrating an exemplary operation of the vehicle and the server according to the second embodiment of the present invention.

FIG. 15 is a schematic diagram of a vehicle and a server according to a third embodiment of the present invention.

FIG. 17 is a diagram for explaining an example of a priority according to the third embodiment of the present invention.

FIG. 18 is a schematic diagram of a vehicle and a server according to another embodiment of the present invention.

DESCRIPTION OF EMBODIMENTS

Hereinafter, an embodiment of the present invention will be described with reference to the drawings. In the illustration of the drawings, the same constituents are denoted by the same reference signs, and description thereof is omitted.

First Embodiment

Hereinafter, a first embodiment of the present invention will be described with reference to the drawings. In the illustration of the drawings, the same constituents are denoted by the same reference signs, and description thereof is omitted.

Figure 1:
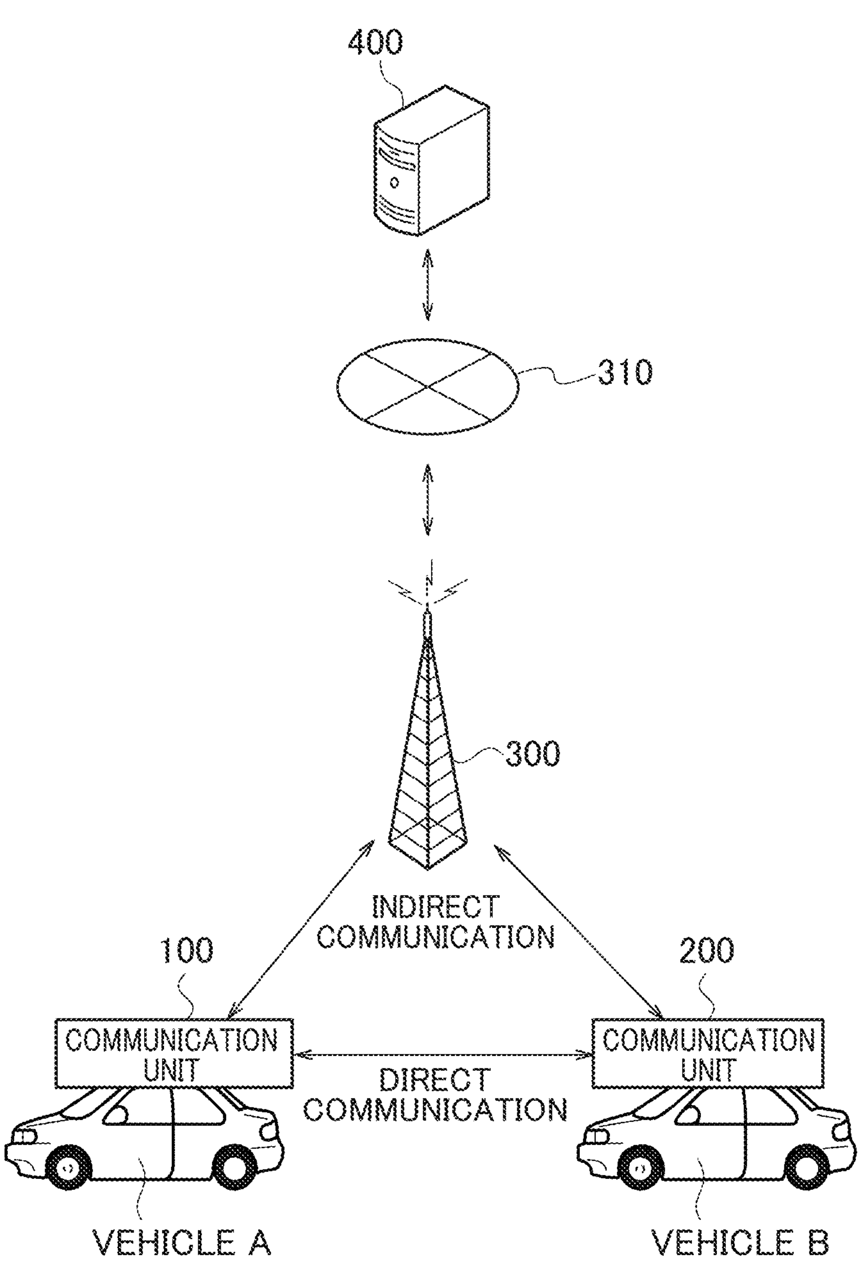
FIG. 1 is a schematic diagram illustrating a communication network according to a first embodiment of the present invention.

An overall outline of a communication network according to the present embodiment will be described with reference to FIG. 1. As shown in FIG. 1, the communication network according to present embodiment includes a vehicle A, a vehicle B, a base station 300, a cellular phone network 310, and a server 400.

The vehicle A (moving object) comprises a communication unit 100 having a communication function. The vehicle B (another moving object) comprises a communication unit 200 having a communication function. The communication unit 100 and the communication unit 200 are, for example, an antenna, a modem, an application processor, a memory, and the like. The communication unit 100 and the communication unit 200 communicate via the base station 300 and the cellular phone network 310 with the server 400. The base station 300 is a fixed communication device that does not move and is an access point that covers the cellular phone network 310. The communication unit 100 and the communication unit 200 can communicate with each other via the base station 300 and the server 400. Hereinafter, communication via the base station 300 and the server 400 between the communication unit 100 and the communication unit 200 is defined as indirect communication. In the present embodiment, the indirect communication is performed by using the cellular phone network 310, an internet network, or a server. However it is not limited thereto. Other wireless communication systems (for example, wifi hotspots, servers on wifi networks, or closed networks of cellular phone networks, etc.) may be used.

Further, the communication unit 100 and the communication unit 200 can communicate directly without passing through the base station 300 and the server 400. Such communication that does not pass the base station 300 and the server 400 is defined as the direct communication in the following. The direct communication may be expressed as an inter-vehicle communication. In the present embodiment, the vehicle A and the vehicle B share a plurality of data relating to vehicles (including the vehicle A, the vehicle B, and other vehicles), road information, and the like through the direct communication or the indirect communication. The plurality of data includes positional information, speed information, data related to a traveling direction, and the like. Since the direct communication does not pass the base station 300 and the server 400, the data can be transmitted to the other party with a low delay and a simple configuration. The indirect communication is used to send large data that cannot be sent by the direct communication, or to send information repeatedly for a certain period of time. The indirect communication is used in cases where the direct communication is not possible.

The vehicles A and B may be vehicles having an autonomous driving function or vehicles not having the autonomous driving function. The vehicles A and B may be vehicles capable of switching between the autonomous driving and the manual driving. In the present embodiment, the vehicles A and B will be described as vehicles having the autonomous driving function.

Next, with reference to FIG. 2, a configuration example of the vehicle A, the vehicle B, and the server 400 will be described.

First, a configuration example of the vehicle A will be described.

As shown in FIG. 2, the vehicle A includes the communication unit 100, a GPS receiver 101, a sensor 102, and a controller 110. The communication unit 100, the GPS receiver 101, the sensor 102, and the controller 110 may be collectively referred to as an information processing device.

The GPS receiver 101 receives radio waves from satellites so as to detect the positional information of the vehicle A on the ground. The positional information of the vehicle A detected by the GPS receiver 101 includes latitude information and longitude information. The GPS receiver 101 outputs the detected positional information of the vehicle A to the controller 110. The method for detecting the positional information of the vehicle A is not limited to the GPS receiver 101. For example, the position may be estimated using a method called odometry. The odometry is a method of estimating the position of the vehicle A by estimating an amount of movement and direction of movement of the vehicle A in accordance with a rotation angle and a rotation angle speed of the vehicle A. The GPS (Global Positioning System) is a part of the GNSS (Global Navigation Satellite System).

The sensor 102 is mounted on the vehicle A and detects information of the vehicle A and an object around the vehicle A. For example, the sensor 102 detects an object on or around a road. The sensor 102 comprises a plurality of sensors. For example, the sensor 102 includes a wheel speed sensor, a steering angle sensor, a gyro sensor, and the like. These sensors detect the speed and steering angle of the vehicle A. The sensor 102 includes a camera, a LiDAR (light detection and ranging), a radar, a millimeter wave radar, a laser range finder, a sonar, etc. These sensors detect a moving object including another vehicle (include the vehicle B), a motorcycle, a bicycle, and a pedestrian, as well as an obstacle, a falling object, a stationary object including a parked vehicle, a road shape, a road structure, and a building around the road as objects around the vehicle A. As specific detection data, when another vehicle exists around the vehicle A, the identification number, position, speed, type (car type), height, traveling direction, past traveling trajectory, future trajectory based on the past traveling trajectory, and the like of the other vehicle are detected. The sensor 102 outputs the detected data to the controller 110.

The controller 110 is a general-purpose microcomputer including a central processing unit (CPU), a memory, and an input-output unit. A computer program is installed on the microcomputer so as to function as the information processing device. The microcomputer functions as a plurality of information processing circuits included in the information processing device when the computer program is executed. While the present embodiment is illustrated with the case in which the software is installed to fabricate the information processing circuits included in the information processing device, dedicated hardware for executing each information processing as described below can be prepared to compose the information processing circuits. The respective information processing circuits may be composed of individual hardware. The controller 110 includes, as examples of the plural information processing circuits, a communication control unit 111 and a data generation unit 112.

The communication control unit 111 controls a communication system based on the communication environment. In present embodiment, the communication environment includes at least one of the following characteristics: reception intensity, moving speed, multiple reflection, channel busy rate, and automatic deletion rate. The moving speed means the vehicle speed of the vehicle A and the vehicle B. The channel busy rate indicates the utilization rate in communication with other devices such as other vehicles and pedestrian terminals. The automatic deletion rate indicates the rate at which data is thinned out when the predetermined channel busy rate is exceeded. When the communication environment is not favorable, the communication control unit 111 switches from the direct communication to the indirect communication. The communication control unit 111 uses the communication environment judged by the communication environment judgment unit 404, but is not limited thereto. The communication control unit 111 may have a function of judging the communication environment. The communication control unit 111 may control the communication system using the communication environment judged by itself.

The data generation unit 112 generates the data to be transmitted to the vehicle B. The data generated by the data generation unit 112 includes an overhead, vehicle information including the current positional information of the vehicle A, the sensor data, and the like. In the following description, the data generated by the data generation unit 112 may be expressed as a message. The overhead includes the message ID, the unique temporary ID of the vehicle A, the authorization code of the vehicle A, etc. The vehicle information includes, in addition to the current positional information of the vehicle A, speed information of the vehicle A, information on the traveling direction, etc. The sensor data is data detected by the sensor 102. As described above, the sensor data includes an identification number, a position, a speed, a type (car type), a height, a traveling direction, a past traveling trajectory, and a future trajectory based on the past traveling trajectory of another vehicle. The transmission period of the message is not particularly limited, but is set to, for example, 10 Hz. The data generation unit 112 outputs the generated data to the communication unit 100.

The communication unit 100 broadcasts and transmits a data package including the current positional information of the vehicle A, the travel plan information, the object data detected by the sensor, etc., around the vehicle A. The direct communication system is used for the broadcast transmission. The direct communication method is, for example, a DSRC method based on IEEE 802.11 p (frequency: 5.9 GHz band), or a cellular V2X method based on 3GPP Release 14 or later. The current positional information is data in which the latitude and longitude indicating the position of the vehicle are associated with the time when the position is acquired. The travel plan information is travel plan data including vehicle speed plan data in which the vehicle speed is associated with the future position of the vehicle and future travel route data. The future travel route data may be route information of a traveling road traveling to a predetermined destination, or may be data in which a future position (latitude, longitude) and a scheduled passing time are associated based on the vehicle speed plan data. For example, the travel plan information is data obtained by adding the vehicle speed plan data to the data based on the message of SAE 2735 (Dedicated Short Range Communications (DSRC) Message Set Dictionary). An example of the vehicle A position data transmitted by broadcast is shown in Table 1. The vehicle A position data is transmitted as package data including header and content data from the communication unit 100, received by the communication unit 200 of the vehicle B, or acquired via the base station 300 by the future route acquisition unit 401 of the server 400.

As shown in Table 1, in the header of the vehicle A position data, the identification number of the vehicle A as the transmission source and identification information (for example, an ID for identification indicating current positional information and travel plan information is provided.) indicating the type of the content included in the content data are stored. The content data stores the current positional information, the travel plan information, and the communication environment of the vehicle, which are data relating latitude and longitude and the time when the information is acquired. The communication environment includes reception intensity, moving speed (moving speed of the vehicle and the moving speed of the vehicle to which the vehicle communicates), multiple reflections, channel utilization and automatic deletion. These header and content data are generated by the controller 110 of the vehicle A based on data acquired from the GPS receiver 101 and various sensors 102 and the data previously recorded in the memory provided in the controller 110, and the vehicle A position data are generated.

TABLE 1

| | |
|---|---|
| header | identification number of transmission vehicle<br>identification information indicating type of content included in content data (for example, current positional information, travel plan information, ID indicating future position are stored) |
| content data | current positional information: latitude, longitude and data associated with time when position information was acquired<br>travel plan information: vehicle speed plan data where vehicle speed is associated with future position of the vehicle and travel plan data including future travel route data<br>communication environment of vehicle: reception intensity, moving speed (moving speed of vehicle and moving speed of vehicle to which vehicle communicate), multiple reflections, channel busy rate and automatic deletion |

Next, a configuration example of the vehicle B will be described.

As shown in FIG. 2, the vehicle B includes the communication unit 200, a GPS receiver 201, and a controller 220. The communication unit 200, the GPS receiver 201, and the controller 220 may be collectively referred to as an information processing device.

The function of the GPS receiver 201 is similar to that of the GPS receiver 101. The controller 220, like the controller 110, is a general-purpose microcomputer having a CPU, a memory, and an input/output unit. The controller 220 includes, as an example of a plurality of information processing circuits, a communication control unit 221 and a data reception unit 222. The function of the communication control unit 221 is the same as that of the communication control unit 111.

The communication unit 200 receives the vehicle A position data transmitted from the communication unit 100 of the vehicle A, and outputs the received the vehicle A position data to the data reception unit 222. The data reception unit 222 acquires the vehicle A position data from the communication unit 200. The fact that the communication unit 200 has received the vehicle A position data means that the direct communication has been established between the vehicle A and the vehicle B. Accordingly, when the communication unit 200 receives the vehicle A position data, the communication control unit 221 transmits, to the server 400, the current positional information of the vehicle A, the vehicle A position data including the travel plan information of the vehicle A, and the signal indicating that the direct communication with the vehicle A has been established. At this time, as per the package data shown in Table 1, the communication control unit 221 transmits the current positional information of the vehicle B and the vehicle B position data including the travel plan information of the vehicle B to the server 400. The data reception unit 222 has a function of previously storing the format of the data generated by the data generation unit 112, and interpreting and storing the data.

Like the controller 110, the server 400 is the general-purpose microcomputer including a CPU, a memory, and an input/output unit. The server 400 includes, as an example of the plurality of information processing circuits, a future route acquisition unit 401, a position prediction unit 402, a data amount estimation unit 403, a communication environment judgment unit 404, a propriety judgment unit 405, and a communication plan generation unit 406.

Based on the vehicle A position data and the vehicle B position data received via the base station 300, the future route acquisition unit 401 acquires current position and travel plan information for each of the vehicles A and B. The future route acquisition unit 401 may receive and acquire these data transmitted from the communication unit 200 of the vehicle B, or may receive the position data (current position information and travel plan information of the vehicle A) of the vehicle A transmitted from the communication unit 100 of the vehicle A and receive the position data (current position information and travel plan information of the vehicle B) of the vehicle B transmitted from the communication unit 200 of the vehicle B. Further, the server 400 may read the travel plan information received in the past and stored in the memory, or may request and receive the travel plan information from each of the vehicles A and B. The future route acquisition unit 401 outputs the acquired travel plan information to the position prediction unit 402.

A position prediction unit 402 predicts future positions of the vehicles A and B in the future based on position information of the vehicles A and B acquired from the vehicle B and travel plan information acquired from the future route acquisition unit 401. For example, the position prediction unit 402 predicts the relative position and the relative distance of the vehicle B with respect to the future the vehicle A based on the predicted future positions of the vehicle A and the vehicle B. The position prediction unit 402 outputs the predicted positional relationship to the communication environment judgment unit 404.

The data amount estimation unit 403 estimates the data amount per 1 second for the data amount transmitted from the vehicle A to the vehicle B by the direct communication. More specifically, the data amount estimation unit 403 estimates the data amount transmitted per second. The data amount estimation unit 403 outputs the estimated data amount to the communication environment judgment unit 404.

The communication environment judgment unit 404 judges the future communication environment between the vehicle A and the vehicle B on the basis of the positional relationship between the vehicle A and the vehicle B in the future predicted by the position prediction unit 402. The communication environment judgment unit 404 estimates the data amount that can be transmitted by the direct communication from the data amount estimated by the data amount estimation unit 403. For the estimation of the data amount, the channel busy rate indicating the state in which other vehicles, pedestrians, etc. are communicating and the data automatic deletion rate indicating the rate of thinning data when the predetermined channel busy rate is exceeded are used. These channel busy rates and data automatic deletion rates are applied to SAEJ 2945/1, for example.

The propriety judgment unit 405 compares the data amount estimated by the data amount estimation unit 403 with the data amount estimated by the communication environment judgment unit 404. A propriety judgment unit 405 judges whether or not all of the data amounts estimated by the data amount estimation unit 403 can be transmitted by the direct communication based on the comparison result. The propriety judgment unit 405 outputs the determination result to the communication plan generation unit 406.

The communication plan generation unit 406 specifies the data amount transmittable by the direct communication and the data amount not transmittable by the direct communication out of the data amount transmitted from the vehicle A to the vehicle B on the basis of the judgment result acquired from the propriety judgment unit 405. The communication plan generation unit 406 generates the communication plan for transmitting by the direct communication the data amount that can be transmitted by the direct communication and the communication plan for transmitting by the indirect communication the data amount that cannot be transmitted by the direct communication. The communication plan generation unit 406 transmits the created communication plan to the vehicle A and the vehicle B.

(Data Quantity Estimation Method)

Next, with reference to FIG. 3, an example of the data amount estimation method estimated by the data amount estimation unit 403 will be described.

As shown in FIG. 3, the data amount directly transmitted by the vehicle A to the vehicle B includes overhead, vehicle information including the current positional information of the vehicle A, past travel trajectory and travel plan information of the vehicle A, recognition information of surrounding objects, and sensor data.

The vehicle information including the current positional information of the vehicle A includes the speed information of the vehicle A, information on the traveling direction, etc. The recognition information of the surrounding object includes the number of other vehicles (in the example shown in FIG. 3, there are 11 units.) around the vehicle A recognized by the vehicle A (sensor 102). The sensor data includes eight pieces of data. The eight data are the identification number, position, speed, type (car type), height, traveling direction, past travel trajectory, and future trajectory based on the past travel trajectory of the other vehicle.

The data amount estimation unit 403 estimates the unit data amount shown in FIG. 3 from the internal information of the data container. For example, with respect to the data unit amount, it is estimated that the overhead is 200 bytes, the vehicle information including the current positional information of the vehicle A is 40 bytes, the information regarding the past travel trajectory of the vehicle A and the travel plan information is 600 bytes, the recognition information of the surrounding objects is 600 bytes, and the sensor data is 3 Mbytes.

The data amount estimation unit 403 estimates the maximum data amount per 1 second based on the estimated data unit amount. For example, when there are 11 vehicles including the vehicle B around the vehicle A and the types of data acquired by the sensor 102 are 8 types, the maximum data amount per 1 second is estimated to be 24 Mbytes+7, 440 bytes, as shown in FIG. 3.

(Communication Environment Judgment Method)

Figure 4:
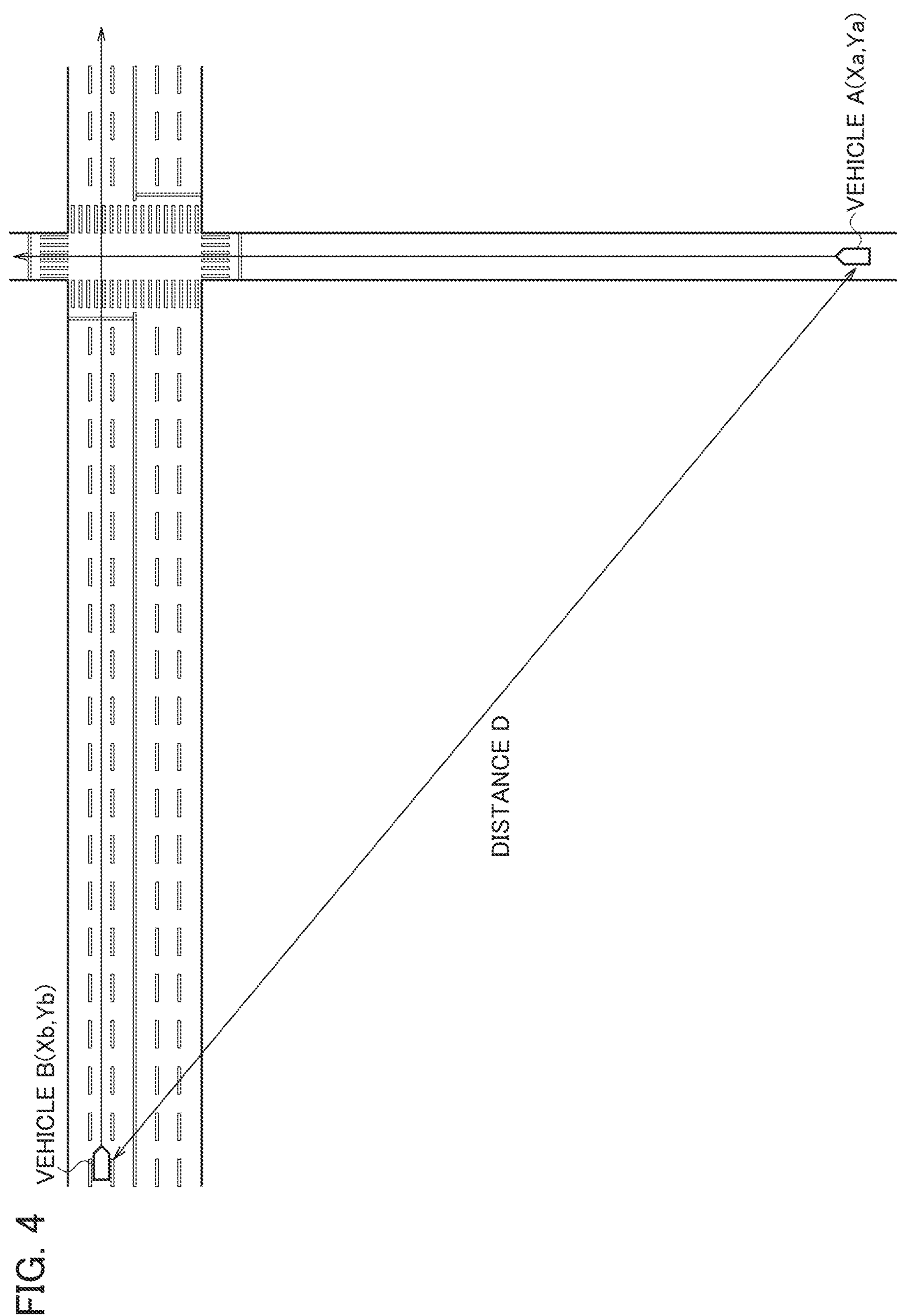
FIG. 4 is a diagram for explaining an example of a traveling scene according to the first embodiment of the present invention.

Next, referring to FIGS. 4 to 5, an example of the communication environment judgment judged by the communication environment judgment unit 404 will be described.

The communication environment judgment unit 404 estimates radio wave intensity on the basis of the positional relationship between the vehicles A and B. The radio wave strength is an index showing the strength of the radio wave. An example of the positional relationship between the vehicle A and the vehicle B will be described with reference to FIG. 4. In the scene shown in FIG. 4, the vehicle A is traveling straight on a one-lane road. Vehicle B is going straight in the middle lane of a three-lane road. The road on which the vehicle A runs intersects the road on which the vehicle B runs. The vehicle A and the vehicle B are traveling at the speed of 40 km/h at the point 500 m before the intersection. Assuming that the position coordinates of the vehicle A are (Xa, Ya) and the position coordinates of the vehicle B are (Xb, Yb), the distance D (hereinafter referred to simply as distance D) between the vehicle A and the vehicle B on the straight line is expressed by equation 1. The initial positions are the position coordinates (Xa, Ya) and (Xb, Yb).

[Math. 1]

$$D=\{(Yb-Ya)^\wedge 2+(Xb-Xa)^\wedge 2\}^\wedge 1/2 \tag{1}$$

The route on which the vehicle A and the vehicle B will travel in the future is acquired by the future route acquisition unit 401. In the scene shown in FIG. 4, the route along which the vehicle A and the vehicle B will travel in the future is the straight route. The position prediction unit 402 predicts the positional relation between the vehicle A and the vehicle B in the future based on the route acquired by the future route acquisition unit 401. Since vehicles A and B are traveling at 40 km/h, the distance D gradually decreases as vehicles A and B approach the intersection. The distance D has the maximum value at the initial position and the minimum value near the intersection. The radio wave intensity changes according to the distance D, that is, according to the positional relationship between the vehicle A and the vehicle B. Therefore, the communication environment judgment unit 404 evaluates the attenuation of the radio wave intensity for each distance from the maximum value to the minimum value of the distance D. The minimum value of the distance D may be set to zero. Formula 2 is used to evaluate the attenuation of the radio wave intensity.

[Math. 2]

$$Pr=Pt+Gr+20\log\left(\frac{\lambda}{\pi}\right)-20\log(d) \tag{2}$$

Here, Pt [dBm] is the actual radiation power of the transmitter, and is generally determined by the antenna power upper limit value according to the law Gr [dB] is the gain of the receiver. λ [m] is the wavelength of the carrier frequency x is the ratio of the circumference of the circle to its diameter.

Generally, since the height of the road surface and the antenna of the vehicle is different, the road surface reflected wave and the direct communication wave overlap. For this reason, it is known that the received power varies greatly according to the distance from the road surface to the antenna. The communication environment judgment unit 404 evaluates this phenomenon using Formulas 3 and 4.

[Math. 3]

$$Pr=Pt+Gr+20\log\left(\frac{\lambda}{2\pi d}\sin\left(\frac{\Delta\phi}{2}\right)\right) \tag{3}$$

[Math. 4]

$$\Delta\phi=\frac{4\pi h_r h_t}{\lambda d} \tag{4}$$

Here, ht is the height of the antenna of the vehicle A. If ht is included in the position information of the vehicle A, its value is used. If ht is not included in the position information of the vehicle A, and if the vehicle A is the large vehicle, ht is set to, for example, 3.5 m based on the height of the vehicle A. Otherwise, based on the general height of the sedan type, e.g. ht is set to 1.55 m. The large-sized vehicle is, for example, a truck or a bus. Whether or not the vehicle A is the large vehicle may be included in the data transmitted from the vehicle A to the vehicle B.

Here hr is the height of the antenna of the vehicle B. Because the setting of hr is the same as ht, a description thereof is omitted. Further, the evaluation method using Formulas 2 to 4 described above is generally known, and therefore description thereof is omitted.

After estimating the radio wave intensity, the communication environment judgment unit 404 evaluates the minimum reception sensitivity Pr_min [dBm] according to the transmission/reception data rate of the communication unit 200, and evaluates the distance range that can be communicated at the transmission/reception data rate. Specifically, the communication environment judgment unit 404 evaluates the reception intensity of the communication unit 200 for each distance. When the ITS frequency (5.9 GHz band) is used, for example, the analysis interval of the distance D is set to 1 m based on the inflection point caused by the variation factor (Two-Wave model of ground reflection) of the radio center frequency and the received electric field strength. That is, each distance means, for example, every 1 m.

The evaluation results are shown in FIG. 5. As shown in FIG. 5, the communication environment is classified into an environment level 1 to 5. The environment level 1 means that the communication environment is the best, and the environment level 5 means that the communication environment is the worst. If the reception intensity at all points of the route (hereinafter, the entire section may be referred to as the whole section.) is greater than 10 times the reception sensitivity, the route is classified as environment level 1. More specifically, if the receive strength is greater than 10 times the minimum receive power, it is classified as environment level 1. Minimum receive power means the minimum receive power that can ensure the reception quality required for communication.

In addition, when the reception intensity is higher than 10 times the reception sensitivity in the entire section, the received signal is classified as environment level 2. More specifically, if the received intensity is greater than 10 times the average received power, then it is classified as environment level 2. In addition, if the reception intensity is equal to or approximately 10 times the reception sensitivity in the entire section, it is classified as environment level 3.

When, at some point in the route (hereinafter, some sections may be referred to), the reception intensity is equal to the reception sensitivity, then it is classified as an environmental level 4. When the reception intensity is equal to or lower than the reception sensitivity in the part of the interval, the received signal is classified into the environment level 5. At the environment level 1 to 3, the direct communication is possible in all sections. On the other hand, at the environment level 4 to 5, the direct communication is difficult in some sections. When the reception intensity becomes equal to or lower than the reception sensitivity in some sections, the corresponding section is recorded.

As described above, the communication environment judgment unit 404 judges that the direct communication is possible in all sections when the reception intensity exceeds the threshold value in all sections as a result of evaluating the reception intensity for each distance. In this way, the communication environment judgment unit 404 can determine whether the other party no longer communicates or whether the communication is only temporarily interrupted on the assumption that the initial connection of the direct communication is accidentally realized or the attenuation suddenly occurs due to the influence of road surface reflection or the like. The communication environment judgment unit 404 estimates the possibility that the modulation system of the communication system is switched to the direct communication according to the received intensity, and judges that the modulation efficiency is approximately 16 times (64 QAM) for the environment level 3 (for example, modulation method QPSK) and approximately 8 times (16 QAM) for the environment level 2 at the environment level 1. The threshold may be defined as the reception sensitivity.

The communication environment judgment unit 404 estimates the data amount that can be transmitted by the direct communication. More specifically, as shown in FIG. 5, when the communication environment is at the environment level 1 and the frequency extension is 2 times the reference bandwidth, the communication environment judgment unit 404 calculates the estimated data transfer amount as 9,600 bytes.

Next, the communication environment judgment unit 404 estimates a data reduction likelihood based on the channel busy rate and the data automatic deletion rate. In general, in the direct communication, the channel busy rate is controlled to be 30 to 70% of the standard set by V2X (Vehicle to Everything communication). For details, refer to the following references. SAE J2945/1, Correction on congestion control for V2X sidelink communication in TS 36.321

The Message that exceed the standard set in V2X are weeded out. Thinning of messages is done by measuring two indicators. One is a measurement of channel utilization and the other is a message-loss measurement based on sequential message reception monitoring (1 second).

First, measurement of the channel busy rate will be described. The communication environment judgment unit 404 measures the current state of the channel busy rate based on the communication unit 100 of the vehicle A and the communication unit 200 of the vehicle B. The communication environment judgment unit 404 obtains a current reduction estimation rate according to the measured channel busy rate. The communication environment judgment unit 404 adopts the result of the lower channel busy rate. Next, the communication environment judgment unit 404 estimates the congestion situation on the future route. Specifically, the communication environment judgment unit 404 estimates that there is a possibility of congestion when a preceding vehicle is ahead of either the vehicle A or the vehicle B on the route, and estimates that the communication environment deteriorates by lowering the environment level by 1 (see FIG. 6).

Next, the automatic data deletion rate will be described. When the communication environment of the vehicle A is not good, the message is thinned out and transmitted. The communication environment judgment unit 404 measures the data deletion tendency based on the counter monitoring of the V2V message. If it is measured that 1 to 3 decimations occur on the 1 second average, set the expected reduction rate at ⅓. The communication environment judgment unit 404 sets the deletion rate to 100% when detecting that no message arrives in 1 second. Further, the communication environment judgment unit 404 sets that approximately ⅔ is deleted when the thinning rate varies on a 5 second average.

The communication environment judgment unit 404 sets, for example, as shown in FIG. 6, the measured value of the channel busy rate to 18%, and if there is no likelihood of congestion thereafter, the reduction likelihood rate to ½. Further, the communication environment judgment unit 404 detects, for example, that the message has been thinned once, and sets the reduction probability to ⅓ when there is no possibility of congestion thereafter. As the result, the estimated data volume for the entire section is 1,600 bytes at 9,600×½×⅓. The communication environment judgment unit 404 estimates that 1,600 bytes is the data amount that can be transmitted by the direct communication. The communication environment judgment unit 404 outputs the estimated value (1,600 bytes) to the propriety judgment unit 405.

The propriety judgment unit 405 compares the data amount estimated by the data amount estimation unit 403 with the data amount estimated by the communication environment judgment unit 404. A propriety judgment unit 405 judges whether or not all of the data amounts estimated by the data amount estimation unit 403 can be transmitted by the direct communication based on the comparison result. As described with reference to FIG. 3, the data amount estimated by the data amount estimation unit 403 is 24 Mbytes+7,440 bytes. On the other hand, the data amount estimated by the communication environment judgment unit 404 is 1,600 bytes. Therefore, the propriety judgment unit 405 judges that all of the data amounts estimated by the data amount estimation unit 403 cannot be transmitted by the direct communication. The propriety judgment unit 405 outputs the judgment result to the communication plan generation unit 406.

The communication plan generation unit 406 specifies the data amount transmittable by the direct communication and the data amount not transmittable by the direct communication out of the data amount transmitted from the vehicle A to the vehicle B on the basis of the judgment result acquired from the propriety judgment unit 405. In this embodiment, the data amount that can be transmitted by the direct communication is 1,600 bytes, and the data amount that cannot be transmitted by the direct communication is 24 Mbytes+5,840 bytes. The communication plan generation unit 406 generates the communication plan for transmitting by the direct communication the data amount transmittable by the direct communication and the communication plan for transmitting by the indirect communication the data amount cannot be transmitted by the direct communication.

The communication plan generation unit 406 generates the communication plan so that the direct communication is selected for data with higher priority. Since the vehicle A can transmit data of 1,600 bytes by the direct communication, the communication plan generation unit 406 selects data of high priority to generate data of 1,600 bytes. High priority data will be described with reference to FIG. 7. In this embodiment, the overhead shown in FIG. 7 has the highest priority and the sensor data has the lowest priority. That is, the priority decreases from the overhead toward the sensor data.

As shown in FIG. 7, 840 bytes is obtained by adding the overhead, the vehicle information including the current positional information of the vehicle A, the information on the past travel trajectory of the vehicle A, and the travel plan information. Therefore, these data can be transmitted by the direct communication. Therefore, the communication plan generation unit 406 generates the communication plan so that these data are transmitted by the direct communication. The remainder of the data amount that can be transmitted by the direct communication is 760 bytes. Therefore, the recognition information (600 bytes) for one other vehicle can be transmitted by the direct communication. As described above, the communication plan generation unit 406 generates the communication plan so that overhead, vehicle information including the current positional information of the vehicle A, information and travel plan information regarding the past travel trajectory of the vehicle A, and recognition information for one other vehicle are directly transmitted by communication. That is, the data amount transmitted by the direct communication is 1,440 bytes. As shown in FIG. 7, the communication plan generation unit 406 generates the communication plan so that the remaining data amount (24 Mbytes+6,000 bytes) is transmitted by the indirect communication. Then, the communication plan generation unit 406 transmits the created communication plan to the vehicle A and the vehicle B. Thus, the vehicle A and the vehicle B can be connected to the indirect communication in advance before the direct communication is cut off, so that smooth data sharing is realized.

Figure 8:
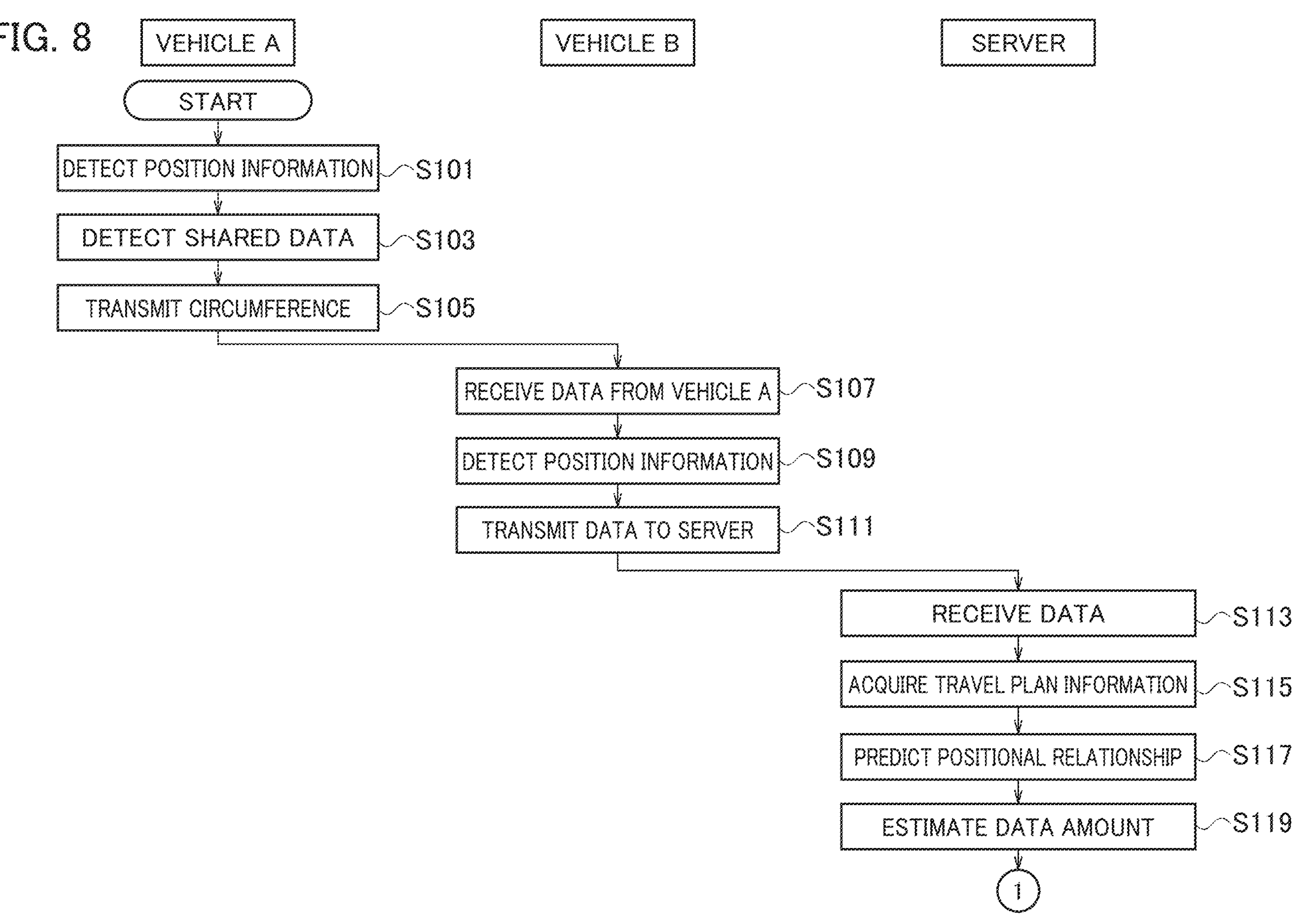
FIG. 8 is a flowchart illustrating an exemplary operation of the vehicle and the server according to the first embodiment of the present invention.
Figure 9:
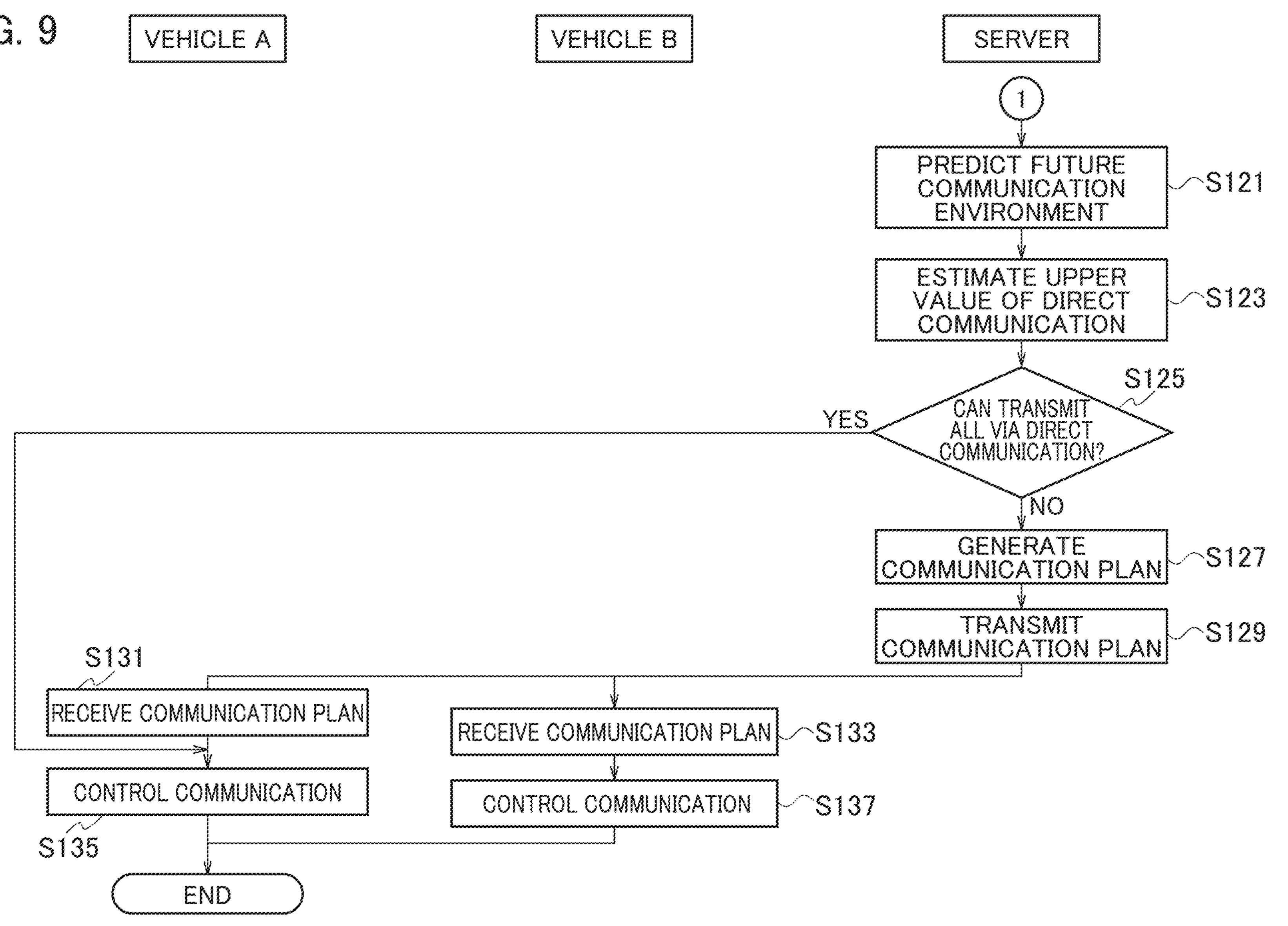
FIG. 9 is a flowchart illustrating an exemplary operation of the vehicle and the server according to the first embodiment of the present invention.

Next, operation examples of the vehicle A, the vehicle B, and the server 400 will be described with reference to the flowchart shown in FIGS. 8 to 9.

In step S101, the vehicle A detects the position information of the vehicle A using the GPS receiver 101. The process proceeds to step S103, where the vehicle A detects data shared with the vehicle B. The data shared with the vehicle B are position information, speed information and information on the traveling direction of the vehicle A. The position information of the vehicle A is detected in step S101. The data shared with the vehicle B includes the identification number, position, speed, type (car type), height, traveling direction, past traveling trajectory, future trajectory based on the past traveling trajectory, and the like of the other vehicle. The process proceeds to step S105, in which the vehicle A broadcasts the data detected in steps S101 and S103 around the vehicle A.

The process proceeds to step S107, where the vehicle B receives data from the vehicle A. The process proceeds to step S109, where the vehicle B detects the position information of the vehicle B using the GPS receiver 201. The process proceeds to step S111, in which the vehicle B transmits to the server 400 position information of the vehicle A, position information of the vehicle B, and the signal indicating that the direct communication with the vehicle A has been established.

The process proceeds to step S113, where the server 400 receives data from the vehicle B. The process proceeds to step S115, where the server 400 acquires travel plan information of the vehicles A and B. In step S117, the server 400 predicts the positional relationship between the vehicle A and the vehicle B in the future based on the travel plan information acquired in step S115. The process proceeds to step S119, in which the server 400 estimates the data amount per second for the data amount transmitted from the vehicle A to the vehicle B by the direct communication. In this embodiment, the maximum data amount per second is estimated to be 24 Mbytes+7,440 bytes, as shown in FIG. 3.

The process proceeds to step S121, where server 400 judges the future communication environment between the vehicle A and the vehicle B based on the predicted future the vehicle A and the vehicle B positional relationship in step S117. As the result, the communication environment is classified into an environment level 1 to 5 as shown in FIG. 5. In addition, the server 400 estimates the data amount (upper limit value) that can be transmitted by the direct communication out of the data amount estimated in step S119. The channel busy rate and the automatic data deletion rate are used for the estimation.

The process proceeds to step S125, where the server 400 compares the data amount estimated in step S119 with the data amount estimated in step S123. Based on the comparison result, the server 400 judges whether all of the data amounts estimated in step S119 can be transmitted by the direct communication. If all of the data amounts estimated in step S119 can be transmitted by the direct communication (Yes in step S125), then vehicles A and B continue to communicate directly.

On the other hand, if it is impossible to transmit all of the data amount estimated in step S119 by the direct communication (No in step S125), the process proceeds to step S127, in which the server 400 specifies the data amount that can be transmitted by the direct communication and the data amount that cannot be transmitted by the direct communication, out of the data amount that the vehicle A transmits to the vehicle B. The server 400 prepares the communication plan for transmitting by the direct communication the data amount that can be transmitted by the direct communication and the communication plan for transmitting by the indirect communication the data amount that cannot be transmitted by the direct communication. Further, the server 400 prepares the communication plan so that the direct communication is selected as the priority of data is higher.

The process proceeds to step S129, where the server 400 transmits the communication plan created in step S127 to the vehicles A and B. The process proceeds to steps S131 and S133, and the vehicles A and B receive the communication plan. The processing proceeds to steps S135 and S137, and the vehicles A and B perform communication based on the communication plan.

[Operational Advantage]

According to the first embodiment, the future communication environment is judged, and it is judged whether or not the data amount to be transmitted can be transmitted by the direct communication. The communication plan is prepared for each of the direct communication and the indirect communication based on the judgment result, and the communication plan is transmitted to vehicles A and B. Thus, the vehicle A and the vehicle B can be connected to the indirect communication in advance before the direct communication is disconnected. This reduces the time required for the initial connection when switching from the direct communication to the indirect communication, thereby achieving smooth data sharing. When the direct communication is established between the vehicle A and the vehicle B, it is judged whether or not the direct communication can be maintained in the future route. In the future, if the direct communication can be maintained, location information and the like will be shared by the direct communication, so for example, it will be possible to formulate the plan concerning autonomous driving support with the margin.

According to the present embodiment, the communication plan is created so that the higher priority data among the plurality of data is, the more direct communication is selected. As described above, since the direct communication can transmit data to the other party with the low delay and the simple configuration, sharing of data having the high priority is accelerated.

According to the present embodiment, the data amount that can be transmitted by the direct communication and the data amount that cannot be transmitted by the direct communication are specified in the data amount to be transmitted to the vehicle B. Then, the communication plan for transmitting by the direct communication the data amount that can be transmitted by the direct communication and the communication plan for transmitting by the indirect communication the data amount that cannot be transmitted by the direct communication are prepared. The data to be shared earlier can be sent directly, and the remaining data can be sent indirectly.

Second Embodiment

Next, a second embodiment of the present invention will be described with reference to FIG. 10. The second embodiment differs from the first embodiment in that the server 400 further includes a road information acquisition unit 407 and a congestion estimation unit 408. A description of the configuration that overlaps the first embodiment will be omitted with reference to reference numerals. Hereinafter, the difference will be mainly described.

The road information acquisition unit 407 acquires map information (including road structure, number of lanes on the road, structures on the road, etc.), congestion information, vacant states of nearby parking lots, accident information, construction information, signal information, etc. The road information acquisition unit 407 may acquire this information from the vehicle B or from a cloud on the Internet. Vehicle B can obtain this information via V2I (VEHICLE TO INFRASTRUCTURE) and provide it to server 400. V2I is a technology for exchanging information between vehicles and communication equipment installed on roads, and is sometimes called roadside-to-vehicle communication. Further, the vehicle B can acquire information on the preceding vehicle using V2I. The vehicle B may acquire information on the preceding vehicle using a sensor (not shown). Further, the vehicle B can detect whether or not the vehicle around the vehicle B changes the lane by using a sensor (not shown). For example, the vehicle B can detect the presence or absence of lane change by detecting the presence or absence of lighting of the direction indicator of the surrounding vehicle. The information detected by the vehicle A may include such information. The road information acquisition unit 407 outputs the acquired information to the congestion estimation unit 408.

Figure 11:
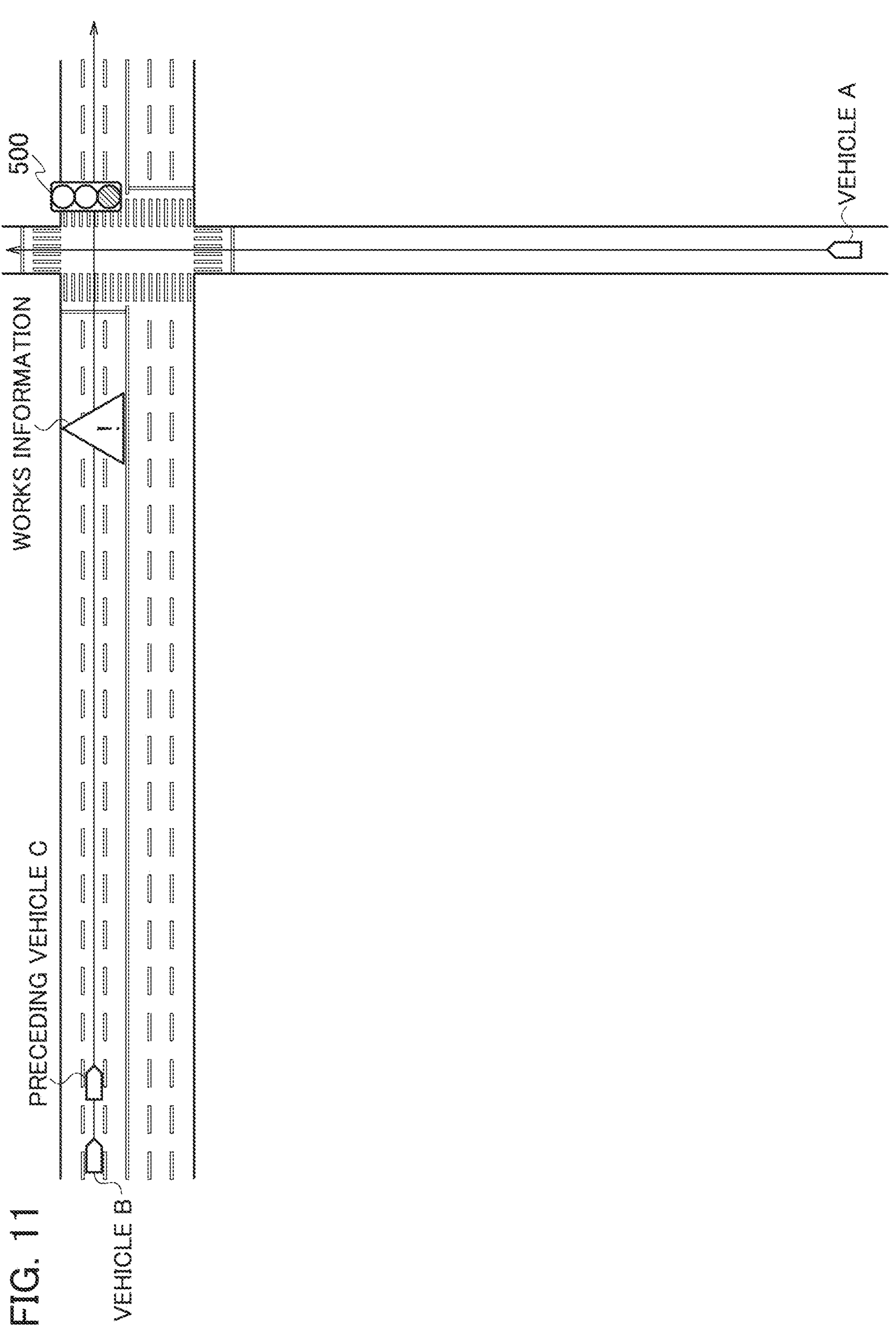
FIG. 11 is a diagram for explaining an example of a traveling scene according to the second embodiment of the present invention.

The congestion estimation unit 408 estimates congestion of the route on which the vehicle A and the vehicle B will travel in the future based on information acquired from the road information acquisition unit 407. This point will be described with reference to FIG. 11. In the example shown in FIG. 11, the congestion on the route on which the vehicle B will travel in the future will be described, but the same applies to the vehicle A. As shown in FIG. 11, if the preceding vehicle C exists in front of the vehicle B and the speed of the vehicle B is lower than the prescribed speed, it is estimated that the route on which the vehicle B will travel in the future will be congested. Alternatively, as shown in FIG. 11, if the signal 500 on the route on which the vehicle B will travel in the future is red, it is estimated that the route on which the vehicle B will travel in the future will be congested. Alternatively, if the nearby parking lots on the route on which the vehicle B will travel in the future are full, it is estimated that the route on which the vehicle B will travel in the future will be crowded. Alternatively, if the congestion information is detected on the route on which the vehicle B will travel in the future, it is estimated that the route on which the vehicle B will travel in the future will be congested. Alternatively, if accident information or construction information is detected on the route on which the vehicle B will travel in the future, it is estimated that the route on which the vehicle B will travel in the future will be congested. Alternatively, if the lane change of another vehicle is detected on the route on which the vehicle B will travel in the future, it is estimated that the route on which the vehicle B will travel in the future will be congested. The congestion estimation unit 408 outputs the estimation result to the communication environment judgment unit 404.

The communication environment judgment unit 404 corrects the channel busy rate measurement result based on the information acquired from the congestion estimation unit 408. As an example of the correction method, the communication environment judgment unit 404 corrects the channel busy rate measurement result based on the number of lanes, the degree of congestion, and the diffusion rate of the on-board device. In this embodiment, the on-vehicle device is a device for performing the direct communication or the indirect communication such as the communication unit 100 and the communication unit 200. The correction formula is expressed as distance to intersection/(vehicle head time× vehicle speed)×number of lanes×penetration rate. In the scene shown in FIG. 11, it is assumed that, in other words, assume that the distance from the vehicle B to the intersection is 400 m, the current channel busy rate is 10%, the headway time is 3 seconds, the vehicle speed of the vehicle B is 40 km/h, the number of lanes is 3, the number of vehicles around the vehicle B is 46, and the diffusion rate of on-board device is 50%. When this assumption is applied to the correction equation, the corrected channel busy rate is 23%. Accordingly, the communication environment judgment unit 404 changes the communication environment to the environment level 2 (see FIG. 5). It should be noted that the channel busy rate is assumed to be a case in which the channel of 1 millisecond per vehicle is occupied. When the corrected channel busy rate is smaller than the current channel busy rate, the current channel busy rate is used. The data generation of the penetration rate may be performed by a known statistic, a trend from the cloud server, an estimation based on the data communication situation in the past, or the like.

Figure 12:
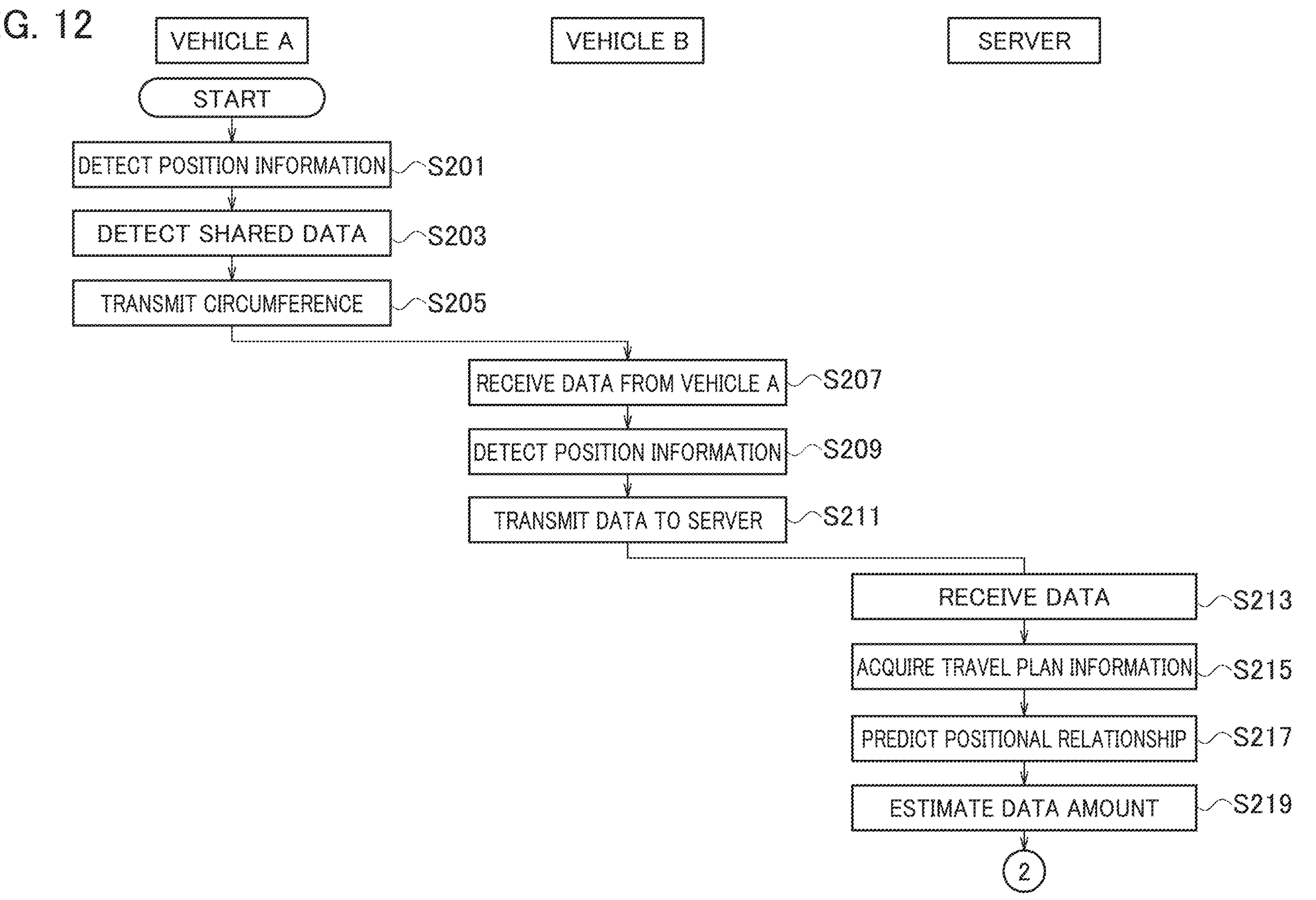
FIG. 12 is a flowchart illustrating an exemplary operation of the vehicle and the server according to the second embodiment of the present invention.
Figure 14:
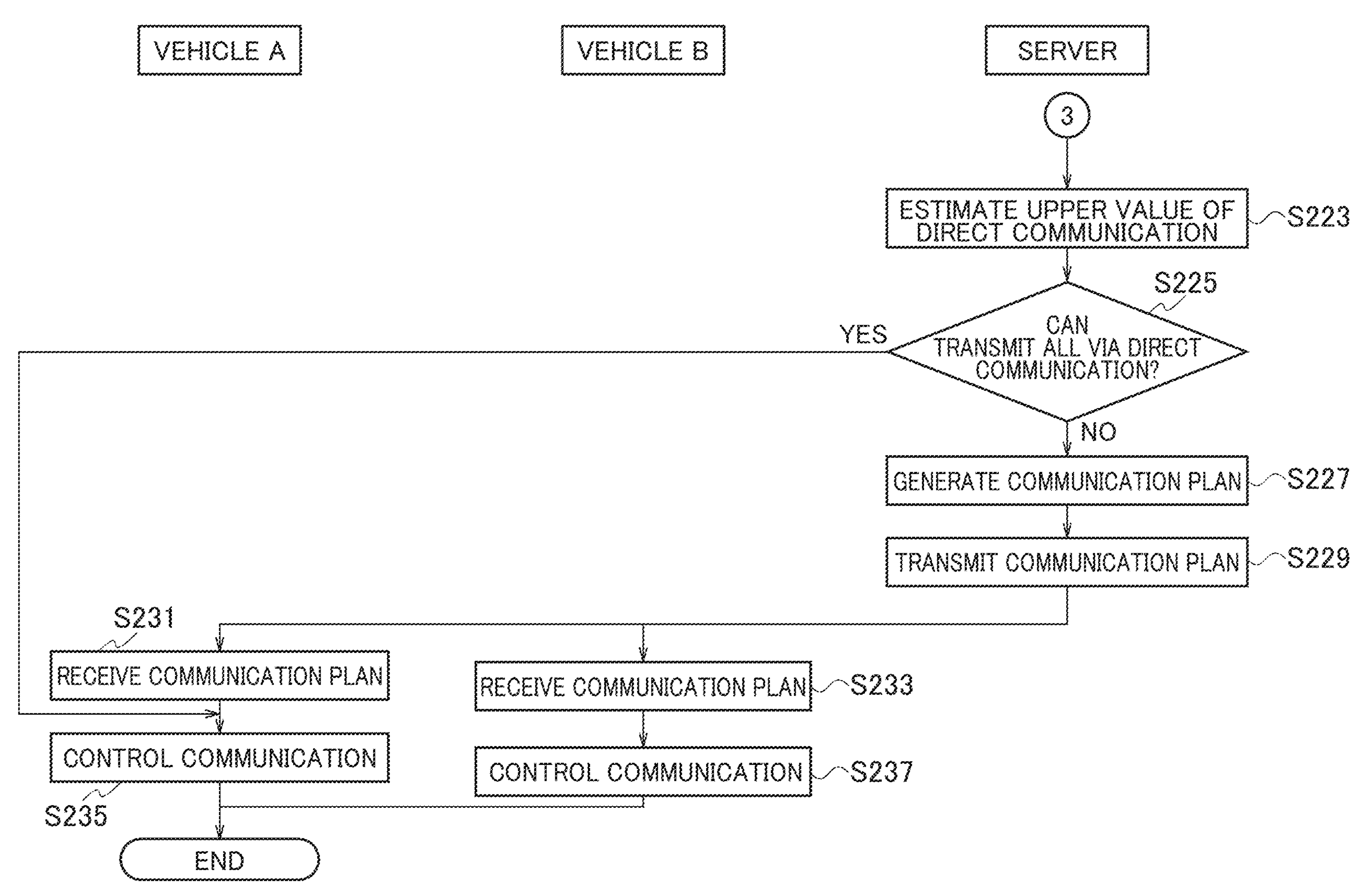
FIG. 14 is a flowchart illustrating an exemplary operation of the vehicle and the server according to the second embodiment of the present invention.

Next, operation examples of the vehicle A, the vehicle B, and the server 400 will be described with reference to a flowchart shown in FIGS. 12 to 14. The process in steps S201 to S221, S223 to S237 are the same as the process in steps S101 to S121, S123 to S137 shown in FIGS. 8 to 9, and overlapping explanations are not repeated below.

In step S221*a*, the server 400 judges whether the speed of the vehicle B is slower than the prescribed speed. If the speed of the vehicle B is slower than the prescribed speed (Yes in step S221*a*), the process proceeds to step S221*b*. On the other hand, if the speed of the vehicle B is the prescribed speed (No in step S221*a*), the process proceeds to step S221*c*. In step S221*b*, the server 400 judges whether or not the preceding vehicle C exists in front of the vehicle B. If the preceding vehicle C exists in front of the vehicle B (Yes in step S221*b*), the process proceeds to step S221 h. On the other hand, if there is no preceding vehicle C ahead of the vehicle B (No in step S221*b*), the process proceeds to step S221*c*.

In step S221*c*, the server 400 judges whether the signal 500 on the route on which the vehicle B will travel in the future is blue. If the signal 500 on the route on which the vehicle B will travel in the future is blue (Yes in step S221*c*), the process proceeds to step S221*d*. On the other hand, if the signal 500 on the route on which the vehicle B will travel in the future is red (No in step S221*c*), the process proceeds to step S221*h*. In step S221*d*, the server 400 judges whether there is a vacancy in a nearby parking lot on the route on which the vehicle B will travel in the future. If there is a vacancy in the parking lot (Yes in step S221*d*), the process proceeds to step S221*e*. On the other hand, if the parking lot is full (No in step S221*d*), the process proceeds to step S221*h*.

In step S221*e*, the server 400 judges whether there is congestion information on the route on which the vehicle B will travel in the future. If there is congestion information (Yes in step S221*e*), the process proceeds to step S221*f*. On the other hand, if there is no congestion information (No in step S221*e*), the process proceeds to step S221*h*. In step S221*f*, the server 400 judges whether there is accident information or construction information on the route on which the vehicle B will travel in the future. If there is accident information or construction information (Yes in step S221*f*), the process proceeds to step S221*g*. On the other hand, if there is no congestion information (No in step S221*f*), the process proceeds to step S221*h*.

In step S221*g*, the server 400 judges whether or not the other vehicle changes lanes on the route on which the vehicle B will travel in the future. If the other vehicle changes the lane (Yes in step S221*g*), the process proceeds to step S223. On the other hand, if the other vehicle does not change the lane (No in step S221*g*), the process proceeds to step S221*h*. The fact that the process proceeds to step S221*h* means that it is estimated that the route on which the vehicle B will travel in the future will be congested. Therefore, in step S221*h*, the server 400 corrects the channel busy rate measurement result based on the number of lanes, the degree of congestion, and the diffusion rate of the vehicle-mounted device. Thereafter, the process proceeds to step S223.

[Operational Advantage]

In this way, the communication environment judgment unit 404 can determine the communication environment with high accuracy by correcting the channel busy rate based on the estimated result of congestion.

Third Embodiment

Next, a third embodiment of the present invention will be described with reference to FIG. 15. The third embodiment differs from the second embodiment in that the vehicle A further includes a transmission order determination unit 113. The description of the configuration that overlaps the second embodiment will be omitted with reference to reference numerals. Hereinafter, the difference will be mainly described.

Figure 16:
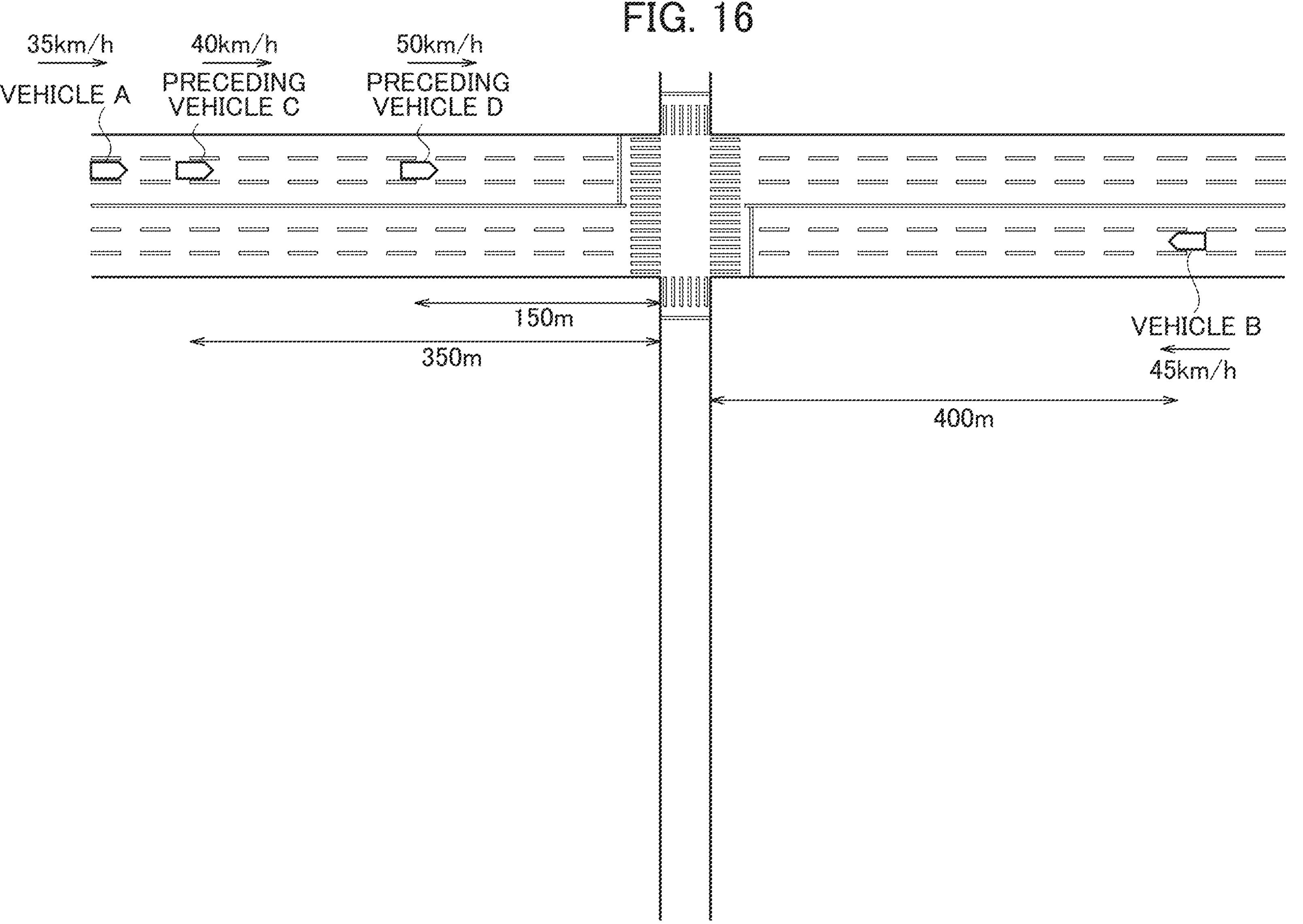
FIG. 16 is a diagram for explaining an example of a traveling scene according to the third embodiment of the present invention.

The transmission order determination unit 113 determines the transmission order of data to be transmitted to the vehicle B. More specifically, as shown in FIG. 16, based on the distance from the vehicle B to the intersection, the speed of the vehicle B, and the like, the transmission order determination unit 113 determines the priority of the information requiring attention of the vehicle B from the information of the surrounding objects detected by the vehicle A. Then, the transmission order determination unit 113 determines to transmit data in order of priority. The communication unit 100 transmits data to the vehicle B in the order judged by the transmission order determination unit 113. Note that the direct communication may be selected for data with higher priority. As shown in FIG. 16, the surrounding objects are the preceding vehicle C and the preceding vehicle D traveling in front of the vehicle A. The information of the surrounding object includes position information and speed information of the preceding vehicle C and the preceding vehicle D.

As an example of the transmission order determination method, the time of arrival at an intersection (hereinafter referred to as estimated arrival time) can be used. For example, as shown in FIG. 16, it is assumed that the preceding vehicle C is traveling at 40 km/h at the point 350 m before the intersection, the preceding vehicle D is traveling at 50 km/h at the point 150 m before the intersection, and the vehicle B is traveling at 45 km/h at the point 400 m before the intersection. It is assumed that the position information, speed information, and the like of the vehicle B, the preceding vehicle C, and the preceding vehicle D are detected in advance by the vehicle A. In this case, the expected arrival time is expressed by Formula 5.

[Math.5]

$$\text{Estimated time of arrival} = \text{Distance from object to intersection} / \text{Velocity of object} \quad (5)$$

The transmission order determination unit 113 determines to transmit the data of an object with an earlier estimated arrival time first. According to Formula 5, the predicted arrival time of the preceding vehicle C is approximately 32 seconds, and the predicted arrival time of the preceding vehicle D is approximately 11 seconds. Therefore, the preceding vehicle D arrives at the intersection earlier than the preceding vehicle C. Therefore, the transmission order determination unit 113 transmits the data in the order of the preceding vehicle D and the preceding vehicle C. That is, the transmission order determination unit 113 determines that the priority of the preceding vehicle D is higher than that of the preceding vehicle C.

The transmission order determination unit 113 may determine the priority of the data based on the relative distance between the object and the vehicle B. Specifically, the transmission order determination unit 113 may increase the priority as the relative distance between the object and the vehicle B becomes shorter. For example, as shown in FIG. 16, the relative distance between the preceding vehicle D and the vehicle B is 550 m, and the relative distance between the preceding vehicle C and the vehicle B is 750 m. In this case, the transmission order determination unit 113 determines that the priority of the preceding vehicle D is higher than that of the preceding vehicle C.

The transmission order determination unit 113 may determine the priority of the data based on the relative velocity of the object and the vehicle B. The reference for the relative velocity may be an object or the vehicle B. The priority of the transmission order determination unit 113 may be increased as the relative speed between the object and the vehicle B becomes higher. For example, in the example shown in FIG. 16, since the preceding vehicle D and the vehicle B face each other, the relative speed between the preceding vehicle D and the vehicle B is 95 km/h. Similarly, since the preceding vehicle C and the vehicle B face each other, the relative speed between the preceding vehicle C and the vehicle B is 85 km/h. In this case, the transmission order determination unit 113 determines that the priority of the preceding vehicle D is higher than that of the preceding vehicle C.

The transmission order determination unit 113 may determine the priority of the data based on the type of the object. For example, when the preceding vehicle D shown in FIG. 16 is the large vehicle such as a bus or a truck and the preceding vehicle C shown in FIG. 16 is a normal automatic vehicle, the transmission order determination unit 113 determines that the preceding vehicle D has a higher priority than the preceding vehicle C.

The transmission order determination unit 113 may determine the priority of the data on the basis of the traffic rules of the intersection and the possibility of crossing. Specifically, the transmission order determination unit 113 evaluates the priority in 5 stages (level 1 to level 5) on the basis of the traffic rules of the intersection and the possibility of crossing. Level 1 has the highest priority and level 5 has the lowest priority. The details will be described with reference to FIG. 17. FIG. 17 uses the scene shown in FIG. 16.

As shown in FIG. 17, when the vehicle B is traveling on an oncoming road and turns right at an intersection, and when the vehicle A, the preceding vehicle C, and the preceding vehicle D go straight through the intersection, the vehicle B becomes the non-priority side at the intersection. The vehicle B may intersect with the preceding vehicle D or the preceding vehicle C. Therefore, the transmission order determination unit 113 determines that the priority of the data of the preceding vehicle C and the preceding vehicle D is level 1.

On the other hand, when the vehicle B is traveling on an oncoming road and turns right at an intersection, and when the vehicle A, the preceding vehicle C, and the preceding vehicle D also turn right at the intersection, there is almost no possibility that the vehicle B crosses the preceding vehicle D or the preceding vehicle C. Therefore, the transmission order determination unit 113 determines that the priority of the data of the preceding vehicle C and the preceding vehicle D is level 5. Similarly, the transmission order determination unit 113 determines the priority based on the possibility of crossing at the intersection and the priority and non-priority at the intersection. The transmission order determination unit 113 determines that the direct communication is selected for data with higher priority. In the example shown in FIG. 17, for example, if the priority is judged to be level 1 or level 2, the transmission order determination unit 113 determines that the data of the preceding vehicle D and the preceding vehicle C are to be directly communicated.

In this way, the transmission order determination unit 113 determines the priority according to at least one of the time when the object (the preceding vehicle C and the preceding vehicle D) reaches the intersection, the relative distance between the object and the vehicle B, the relative speed between the object and the vehicle B, the type of the object, and the traffic rules of the intersection. Then, the transmission order determination unit 113 determines that the direct communication is selected for data with higher priority. Thus, the sharing of data with high priority is accelerated.

The respective functions described in the above embodiment can be implemented in single or plural processing circuits. The respective processing circuits include a programmed processing device, such as a processing device including an electric circuit. The respective processing circuits also include an application-specific integrated circuit (ASIC) configured to execute the functions described above, and other devices such as circuit components.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

The communication environment judgment unit 404 of the server 400 may specify the period of time during which the predetermined criterion is not satisfied in the future direct communication environment. The predetermined reference is an index indicating that the direct communication is difficult, for example, as shown in FIG. 5, when the reception intensity becomes equal to or lower than the reception sensitivity of the communication unit 100. The communication environment judgment unit 404 may create the communication plan for switching from the direct communication to the indirect communication only during the period when the predetermined standard are not satisfied. Thus, only when the communication environment deteriorates, it is possible to switch from the direct communication to the indirect communication, and smooth data sharing according to the communication environment is realized.

When channel multiplexing is detected, the communication environment judgment unit 404 may create the communication plan for switching from the direct communication to the indirect communication. Thus, only when channel multiplexing is detected, it is possible to switch from the direct communication to the indirect communication, and smooth data sharing according to the communication environment is realized.

The server 400 may also receive data regarding the propriety of the communication plan from at least one of the vehicle A and the vehicle B. The data relating to the propriety of the communication plan is data relating to whether or not the direct communication can be switched to the indirect communication according to the communication plan. By receiving data related to the propriety of the communication plan, the processing of one on-board device can be shared.

In the above-described embodiment, the determination of the communication environment and the creation of the communication plan are performed by the server 400, but the present invention is not limited thereto. For example, as shown in FIG. 18, determination of the communication environment, preparation of the communication plan, and the like may be performed by the vehicle A. As shown in FIG. 18, the functions of the future route acquisition unit 114, the position prediction unit 115, the data amount estimation unit 116, the communication environment judgment unit 117, the propriety determination unit 118, and the communication plan generation unit 119 of the controller 110 of the vehicle A are the same as those of the future route acquisition unit 401, the position prediction unit 402, the data amount estimation unit 403, the communication environment judgment unit 404, the propriety judgment unit 405, and the communication plan generation unit 406 shown in FIG. 2.

That is, the controller 110 judges whether or not it is possible to transmit or receive the data amount relating to the data amount information by the direct communication based on the position information in which the mobile body and other mobile bodies will travel in the future, the communication environment information for the direct communication in the future according to the position information in which the mobile body and other mobile bodies will travel in the future, the data amount information to be transmitted to or received from other mobile bodies in the future, and if it is judged that the data amount can be transmitted or received by the direct communication, the controller 110 can prepare communication plan information between the mobile body and other mobile bodies for at least either of the direct communication and the indirect communication, and transmit the communication plan information to other mobile bodies. The communication plan information is information pertaining to the communication plan. The communication plan described above may be read as communication plan information. The data amount information is information related to the data amount. The communication environment information includes any one of reception intensity, moving speed, multiple reflection, channel busy rate or automatic deletion rate channel busy rate.

Further, the controller 110 can preferentially select the direct communication from among the plurality of pieces of data based on the priority to create communication plan information. Further, the controller 110 can specify the data amount that can be transmitted by the direct communication or the data amount that cannot be transmitted by the direct communication among the amounts of data to be transmitted to other mobile bodies, and create communication plan information for transmitting by direct communication data that can be transmitted by the direct communication or communication plan information for transmitting by the indirect communication data that cannot be transmitted by the direct communication. The controller 110 can also generate communication plan information for switching from the direct communication to the indirect communication based on detection or prediction of channel multiplexing.

The controller 110 of the vehicle A shown in FIG. 18 may specify the period of time in which the predetermined standard are not satisfied in the communication environment for the direct communication in the future. The controller 110 of the vehicle A may create the communication plan for switching from the direct communication to the indirect communication only during the period when the predetermined standard are not satisfied. The controller 110 of the vehicle A may create the communication plan for switching from the direct communication to the indirect communication when channel multiplexing is detected. Further, the controller 110 of the vehicle A may receive data regarding the propriety of the communication plan from the vehicle B.

The determination of the communication environment and the preparation of the communication plan may be performed by the vehicle B. Alternatively, determination of the communication environment, creation of the communication plan, and the like may be performed by the mobile edge computer on the cellular phone network or by the server on the Internet.

REFERENCE SIGNS LIST

100 communication unit
101 GPS receiver
102 sensor
110 controller
111 communication control unit
112 data generation unit
113 transmission order determination unit
114 future route acquisition unit
115 position prediction unit
116 data amount estimation unit
117 communication environment judgment unit
118 propriety judgment unit
119 communication plan generation unit
200 communication unit
201 GPS receiver
220 controller
221 communication control unit
222 data reception unit
300 base station
310 cellular phone network
400 server
401 future route acquisition unit
402 position prediction unit
403 data amount estimation unit
404 communication environment judgment unit
405 propriety judgment unit
406 communication plan generation unit
407 road information acquisition unit
408 congestion estimation unit

What is claimed is:

1. An information processing device comprising:

a communication unit mounted on a moving object and communicates directly with the moving object and another moving object or communicates indirectly with the moving object and the another moving object via a fixed and non-moving communication device; and a controller configured to control the direct communication and the indirect communication performed by the communication unit, wherein the controller is configured to:

determine a priority of a message generated by the moving object based on information requiring attention of the another moving object;

select at least one of the direct communication or the indirect communication based on the determined priority;

transmit the message by the selected at least one of the direct communication or the indirect communication, based on a positional information where the moving object and the another moving object travel in future and a communication environment information of the direct communication in future according to the positional information, judge whether the communication environment information of the direct communication satisfies a predetermined standard; and upon determining that the communication environment information does not satisfy the predetermined standard, generate a communication plan information between the moving object and the another moving object for at least one of the direct communication and the indirect communication.

2. The information processing device according to claim 1, wherein the message is data relating to an object on a road or around the road, and the controller is configured to determine the priority according to at least one of an arrival time at which the object reaches an intersection, a relative distance between the object and the another moving object, a relative speed between the object and the another moving object, a type of the object, or a traffic rule of the intersection.

3. The information processing device according to claim 1, wherein the controller is configured to determine an order for transmitting the message to the another moving object by the direct communication or the indirect communication based on the determined priority.

4. The information processing device according to claim 1, wherein the controller is configured to select the direct communication with higher priority based on the determined priority.

5. The information processing device according to claim 1, wherein the communication environment information includes one of a reception intensity, a moving speed, a multiple reflection, a channel utilization rate or an automatic deletion rate.

6. An information processing device comprising:

a communication unit mounted on a moving object and communicates directly with the moving object and another moving object or communicates indirectly with the moving object and the another moving object via a fixed and non-moving communication device; and a controller configured to control the direct communication and the indirect communication performed by the communication unit, wherein the controller is configured to:

determine a priority of a message generated by the moving object based on information requiring attention of the another moving object;

select at least one of the direct communication or the indirect communication based on the determined priority;

transmit the message by the selected at least one of the direct communication or the indirect communication, based on a positional information where the moving object and the another moving object travel in future and a communication environment information of the direct communication in the future according to the positional information, judge whether the communication environment information of the direct communication satisfies a predetermined standard; and upon determining that the communication environment information does not satisfy the predetermined standard, specify a period of time in which the communication environment information does not satisfy the predetermined standard.

7. An information processing device comprising:

a communication unit mounted on a moving object and communicates directly with the moving object and another moving object or communicates indirectly with the moving object and the another moving object via a fixed and non-moving communication device; and a controller configured to control the direct communication and the indirect communication performed by the communication unit, wherein the controller is configured to:

determine a priority of a message generated by the moving object based on information requiring attention of the another moving object;

select at least one of the direct communication or the indirect communication based on the determined priority;

transmit the message by the selected at least one of the direct communication or the indirect communication, based on a positional information where the moving object and the another moving object travel in future and a communication environment information of the direct communication in the future according to the positional information, judge whether the communication environment information of the direct communication satisfies a predetermined standard;

upon determining that the communication environment information does not satisfy the predetermined standard, specify a period of time in which the communication environment information does not satisfy the predetermined standard; and generate a communication plan information between the moving object and the another moving object to switch between the direct communication and the indirect communication during the specified period of time.

8. An information processing device comprising:

a communication unit mounted on a moving object and communicates directly with the moving object and another moving object or communicates indirectly with the moving object and the another moving object via a fixed and non-moving communication device; and a controller configured to control the direct communication and the indirect communication performed by the communication unit, wherein the controller is configured to:

determine a priority of a message generated by the moving object based on information requiring attention of the another moving object;

select at least one of the direct communication or the indirect communication based on the determined priority;

transmit the message by the selected at least one of the direct communication or the indirect communication, based on a positional information where the moving object and the another moving object travel in future and a communication environment information of the direct communication in the future according to the positional information, judge whether the communication environment information of the direct communication satisfies a predetermined standard;

upon determining that the communication environment information does not satisfy the predetermined standard, specify a period of time in which the communication environment information does not satisfy the predetermined standard; and generate a communication plan information between the moving object and the another moving object to switch from the direct communication to the indirect communication only during the specified period of time.

9. An information processing device comprising:

a communication unit mounted on a moving object and communicates directly with the moving object and another moving object or communicates indirectly with the moving object and the another moving object via a fixed and non-moving communication device; and a controller configured to control the direct communication and the indirect communication performed by the communication unit, wherein the controller is configured to:

determine a priority of a message generated by the moving object based on information requiring attention of the another moving object;

select at least one of the direct communication or the indirect communication based on the determined priority;

transmit the message by the selected at least one of the direct communication or the indirect communication, wherein the controller is configured to generate a communication plan information between the moving object and the another moving object for switching from the direct communication to the indirect communication based on detection or prediction of a channel multiplexing.

10. An information processing device comprising:

a communication unit mounted on a moving object and communicates directly with the moving object and another moving object or communicates indirectly with the moving object and the another moving object via a fixed and non-moving communication device; and a controller configured to control the direct communication and the indirect communication performed by the communication unit, wherein the controller is configured to:

determine a priority of a message generated by the moving object based on information requiring attention of the another moving object;

select at least one of the direct communication or the indirect communication based on the determined priority;

transmit the message by the selected at least one of the direct communication or the indirect communication, wherein the controller is configured to receive, from the another moving object, data regarding an availability of a communication plan related to a communication plan information between the moving object and the another moving object for switching from the direct communication to the indirect communication.

11. An information processing method of an information processing device comprising a communication unit mounted on a moving object and communicates directly with the moving object and another moving object or communicates indirectly with the moving object and the another moving object via a fixed and non-moving communication device; a controller that controls the direct communication and the indirect communication performed by the communication unit, the method comprising:

determining a priority of a message generated by the moving object based on information requiring attention of the another moving object;

selecting at least one of the direct communication or the indirect communication based on the determined priority;

transmitting the message by the selected at least one of the direct communication or the indirect communication;

judging, based on a positional information where the moving object and the another moving object travel in future and a communication environment information of the direct communication in the future according to the positional information, whether the communication environment information of the direct communication satisfies a predetermined standard; and generating, upon determining that the communication environment information does not satisfy the predetermined standard, a communication plan information between the moving object and the another moving object for at least one of the direct communication and the indirect communication.

* * * * *